US006725394B1

United States Patent
Bolt

(10) Patent No.: US 6,725,394 B1
(45) Date of Patent: Apr. 20, 2004

(54) MEDIA LIBRARY WITH FAILOVER CAPABILITY

(75) Inventor: Thomas Bolt, Encinitas, CA (US)

(73) Assignee: Quantum Corporation, San Jose, CA (US)

(*) Notice: Subject to any disclaimer, the term of this patent is extended or adjusted under 35 U.S.C. 154(b) by 266 days.

(21) Appl. No.: 09/678,900

(22) Filed: Oct. 2, 2000

(51) Int. Cl.[7] .......................... G06F 12/16; G06F 11/16; G06F 11/22
(52) U.S. Cl. ...................... 714/7; 369/30.06; 369/30.74; 369/30.89; 711/161; 711/162; 711/4; 711/5; 711/11; 360/780.03; 714/3; 714/5; 714/6; 714/8
(58) Field of Search .......................... 360/78.03, 78.02, 360/85, 91, 92, 93, 255.2, 134, 271, 261.1; 369/30.06, 30.1, 30.2, 30.31, 30.39, 30.4, 30.41, 30.42, 30.43, 30.45, 30.46, 30.6, 30.74, 30.89; 709/105; 710/49; 711/4, 5, 11, 161, 162, 714, 3, 6, 7, 8

(56) References Cited

U.S. PATENT DOCUMENTS

| 5,231,552 A | | 7/1993 | Schneider et al. | |
|---|---|---|---|---|
| 5,236,296 A | | 8/1993 | Ostwald | |
| 5,237,469 A | * | 8/1993 | Kukreja et al. | ............... 360/93 |
| 5,883,864 A | | 3/1999 | Saliba | |
| 5,925,119 A | | 7/1999 | Maroney | |
| 5,970,030 A | * | 10/1999 | Dimitri et al. | ........... 369/30.46 |
| 6,006,308 A | * | 12/1999 | Matsunami et al. | ........ 711/114 |
| 6,237,109 B1 | * | 5/2001 | Achiwa et al. | ................. 714/6 |
| 6,353,878 B1 | * | 3/2002 | Dunham | ..................... 711/162 |
| 6,441,992 B1 | * | 8/2002 | Hedding | ...................... 360/95 |
| 6,502,204 B2 | * | 12/2002 | Achiwa et al. | ................. 714/6 |

* cited by examiner

*Primary Examiner*—B. James Peikrai
(74) *Attorney, Agent, or Firm*—Michael Zarrabian

(57) ABSTRACT

A process/method for controlling a digital data storage unit including a multiplicity of storage media slots for receiving media storage units, a plurality of media storage units loaded in some of the storage media slots, a plurality of data storage drives each having a unique drive address, a loader mechanism for selectively moving a media storage unit between a storage media slot and one of the plurality of data storage drives, and a storage unit controller connected to at least one host computer. One or more of the data storage drives are reserved as spare data storage drives wherein the spare data storage drives are masked from the host computer such the spare data storage drives are not directly accessible by the host computer. The storage unit controller receives and decodes host commands including a source address corresponding to a storage media slot location, and a destination address corresponding to a data storage drive specified by the host computer. The controller determines if the specified data storage drive is available, wherein if the specified data storage drive is not available, the controller performs failover processing by using a spare data storage drive in place of the specified data storage drive.

48 Claims, 14 Drawing Sheets

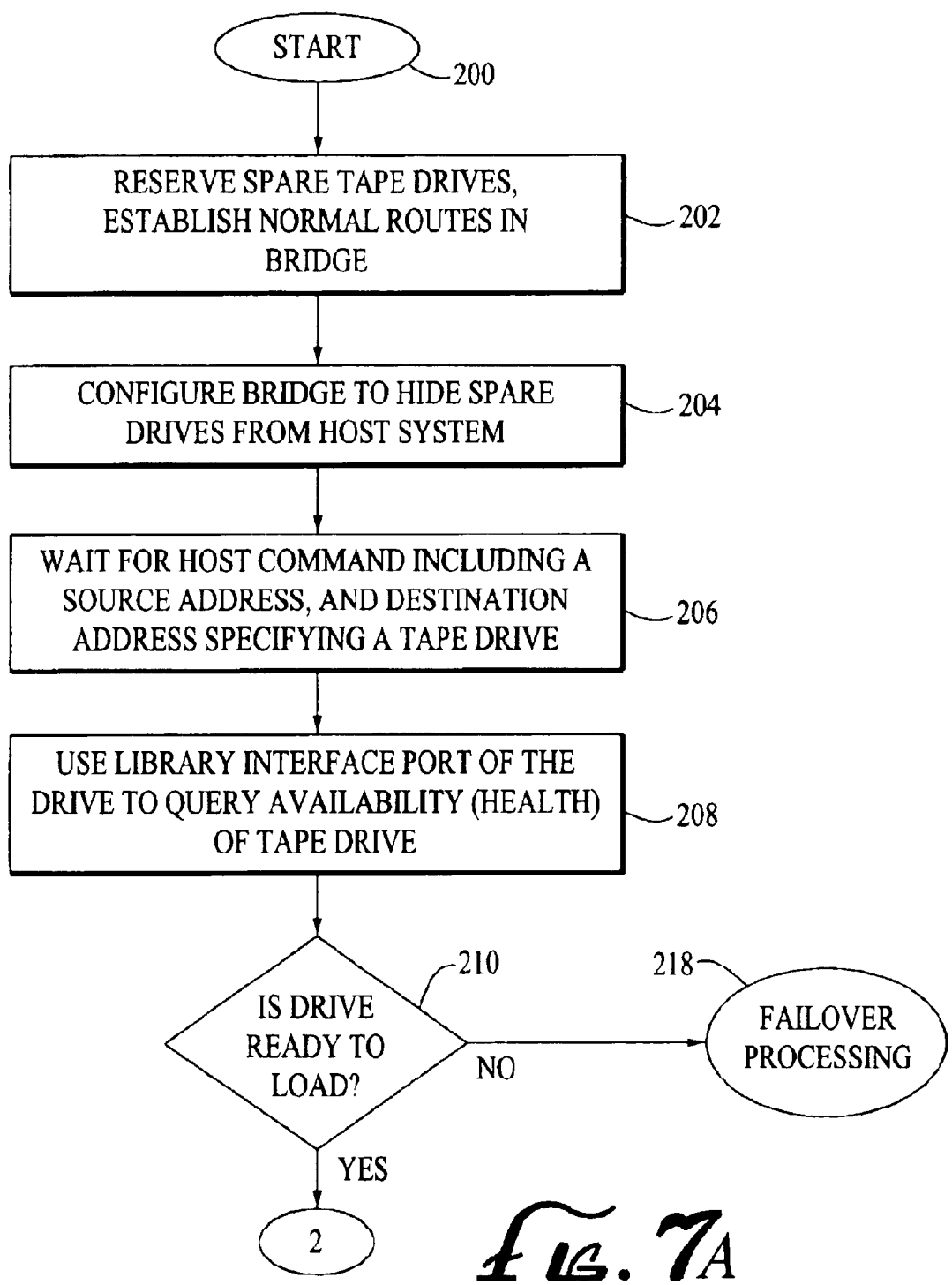

MEDIA LIBRARY WITH FAILOVER CAPABILITY

FIELD OF THE INVENTION

The present invention relates to data storage. More particularly, the present invention relates to a digital storage media library having failover capability.

BACKGROUND OF THE INVENTION

Digital data storage devices are utilized for storing information for use by data processing systems including computer systems. One commonly used data storage medium is tape storage, used in tape libraries, well suited for backup operations as well as for providing archival and retrieval operations for vast quantities of information content. In this regard, optical storage is also known for voluminous content storage and retrieval.

Tape libraries are known in the art. One example of a tape library is provided by the Ostwald U.S. Pat. No. 5,236,296. In that patent, a tape library is described in FIG. 8 as comprising a vast, semi-cylindrical array of tape cartridge storage slots aligned generally along a fixed radius of curvature. A central cartridge inventory is maintained by a library controller, so that logical requests for a particular drive and cartridge may be translated by the library controller into physical device locations and electromechanical operations. In this prior example, a media loader includes a robotic arm rotating at a focus of the cylindrical segment that is elevated and rotated to a particular cartridge storage slot. A picker-gripper mechanism of the arm then "picks" and "grips" the cartridge stored in the slot and moves the cartridge out of the slot and into a temporary transport slot of the arm. The robotic arm is then commanded to perform a second rotation/elevation operation in order to present the retrieved tape cartridge to a loading tray of the selected tape drive, and the drive then loads the cartridge and threads the tape for recording/playback operations, following initial setup and calibration routines conventional with tape drives. The drive may be one of several drives accessible by the robotic arm.

Typically, media loaders (e.g. tape cartridge loader) operate in accordance with a standardized command structure. One such command structure is found in the Small Computer System Interface-2 draft standard X3T9.2 Project 375D (ANSI X3.131-199X). In this particular industry specification, a medium changer device includes a medium transport element, at least one storage element, and a data transfer element. An import/export element may also be supported. A storage element is identified as a storage slot for storing a standard medium unit, such as a disk or a tape cartridge. Typically, in order to access data on a standard medium unit, a host system will have to issue commands to both the medium loader and to the drive. The commands to the loader may include "move medium"; or, "exchange medium" and "read element status". Commands directed by the host to the drive may include "test unit ready", "inquiry", "start-stop" and "load-unload" commands, in addition to the obvious "read/write" commands. One important characteristic about this command structure is that the logical address of the drive is supplied to the media loader as a destination, as well as to the drive itself for subsequent read or write operations from or to the selected and automatically loaded medium unit.

Storage devices such as tape libraries are required to provide fail safe mechanisms for availability and reliability. Tape drives are complex electromechanical devices subject to many forms of failures including those which occur outside of normal data transfer operations. For example, ingestion of the tape leader by a tape drive causes the tape drive to fail and become inoperative. As such, host commands for transferring data to/from tape cartridges via a tape drive that has failed remain unserviced, negatively affecting the operation of host tape access. Conventional tape libraries do not address tape drive failures that occur outside of normal data transfer operations. There is, therefore, a unsolved need has remained for a reliable and fail safe architecture for a digital storage media library for overcoming significant limitations and drawbacks associated with the conventional media libraries.

BRIEF SUMMARY OF THE INVENTION

The present invention satisfies these needs. In one embodiment, the present invention provides a process/method for controlling a digital data storage unit. The digital data storage unit includes a multiplicity of storage media slots for receiving media storage units, a plurality of media storage units loaded in some of the storage media slots, a plurality of data storage drives each having a unique drive address, a loader mechanism for selectively moving a media storage unit between a storage media slot and one of the plurality of data storage drives, and a storage unit controller connected to at least one host computer.

The process for controlling the digital data storage unit is executed by the storage unit controller. Initially, one or more of the data storage drives are reserved as spare data storage drives, wherein the spare data storage drives are masked from the host computer such the spare data storage drives are not directly accessible by the host. The storage unit controller then receives and decodes host commands including a source address corresponding to a storage media slot location, and a destination address corresponding to a data storage drive specified by the host computer.

The controller determines if the specified data storage drive is available. If the specified data storage drive is not available, the controller performs 'failover' processing by using a spare data storage drive in place of the specified data storage drive. In one version, the controller redirects the host commands from the specified data storage drive to the spare data storage drive. In another version, the controller redirects data flow between the host and the specified data storage drive to the spare data storage drive. The controller further, controls the loader to move the media storage unit at the storage media slot location to the spare data storage drive. As such, the present invention provides a reliable and fail safe architecture for a digital storage media library that overcomes significant limitations and drawbacks associated with the conventional media libraries.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
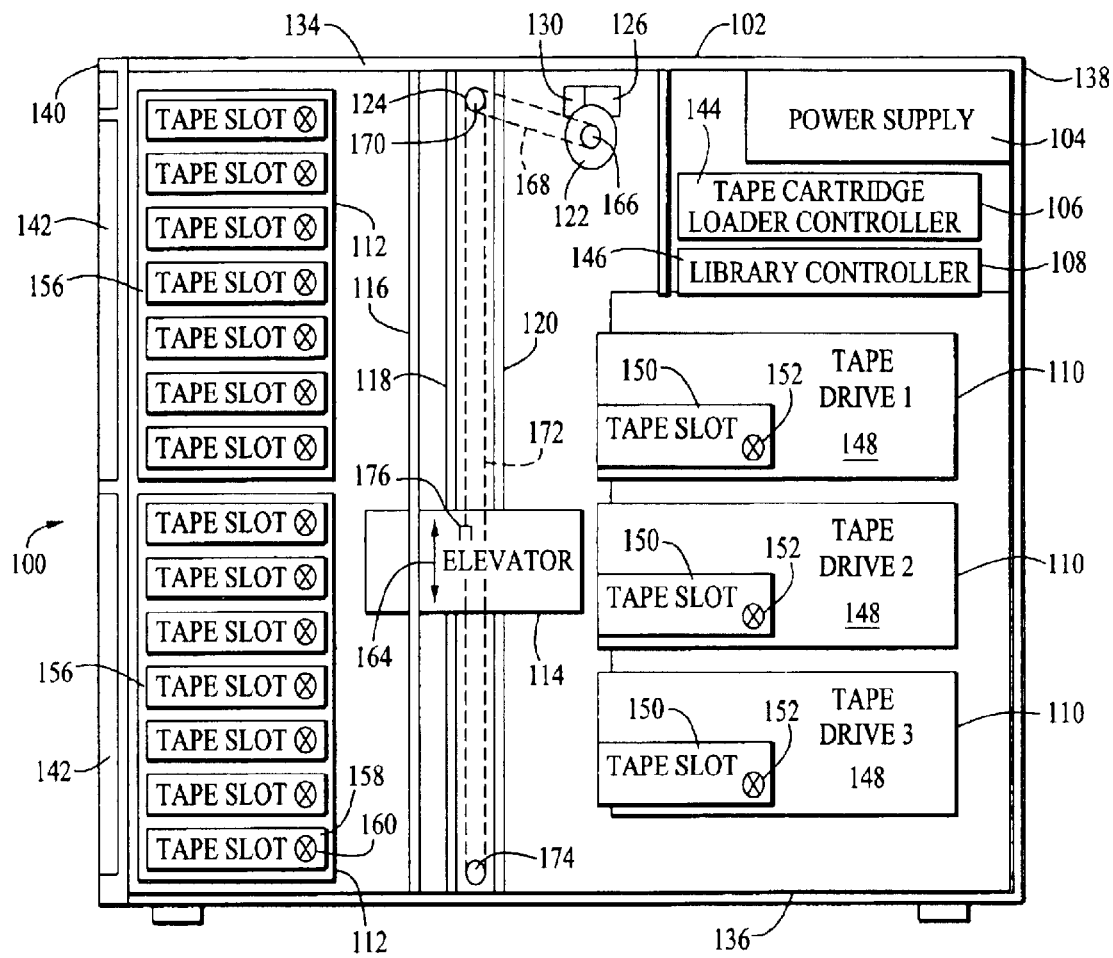
FIG. 1 is an example block diagram of an example multi-cartridge tape loader system in which an embodiment of the present invention is implemented.
Figure 2:
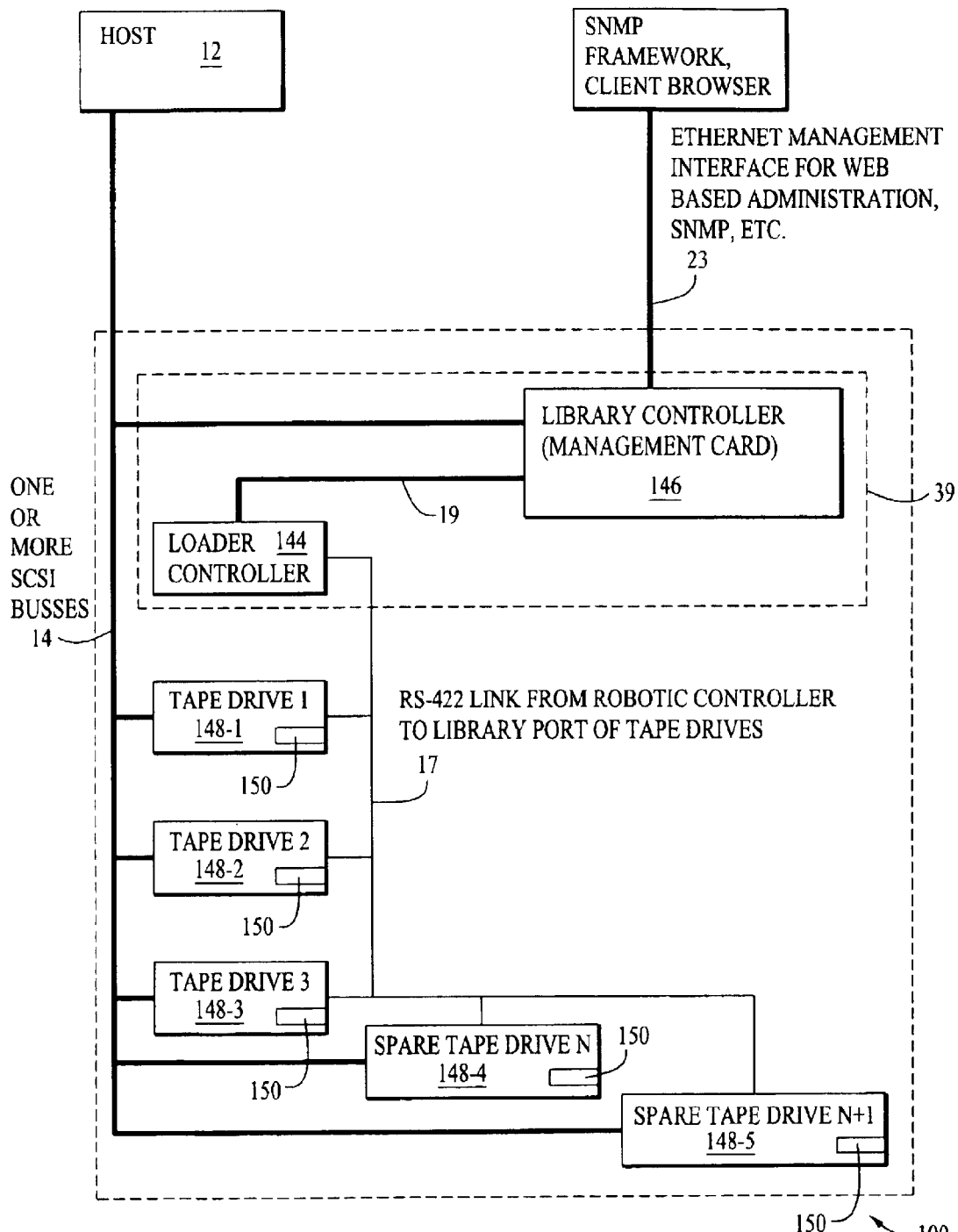
FIG. 2 is an example block diagram of an embodiment a tape loader unit connected to a host computer via a bus structure.

Referring to FIGS. 1–2, there is shown a top view of a multi-drive, multi-magazine mass storage and retrieval tape loader unit 100 (e.g., tape library) for tape cartridges in which the present invention can be implemented. The library unit 100 is configured and operates in accordance with principles of the present invention. The library unit 100 includes a housing 102, a power supply 104, a tape cartridge loader controller slot 106, a library controller slot 108, a plurality of tape drive slots 110, a plurality of tape cartridge magazine slots 112, a tape cartridge pass-through elevator 114, at least one tape cartridge elevator guide shaft 116, a drive shaft 118, a rack drive shaft 120, a tape cartridge elevator motor 122, a pulley drive assembly 124, a roller drive shaft motor 26, and, a rack drive shaft motor 130.

The housing 102 may be substantially rectangular or square in cross section and includes a top side wall 134, a bottom side wall 136, a rear wall 138, and a front panel 140. The front panel 140 includes a plurality of access doors 142 pivotally mounted onto the front 140 opposite the tape cartridge magazine slots 112 that permit manual loading and unloading of tape cartridges by an operator into the tape cartridge magazines within the mass storage and retrieval unit 100. The housing 102 may be constructed of any number of conventional materials such as, for example, those utilized in industry standard rack mount cabinets.

The power supply 104 may be positioned in a rear corner of the housing 102 adjacent to the tape cartridge loader controller slot 106 and library controller slot 108. The power supply 104 provides electrical power in a well known manner to the tape cartridge loader controller slot 106, library controller slot 108, the plurality of tape drive slots 110, tape cartridge elevator motor 122, roller drive shaft motor 126, and rack drive shaft motor 130. The power supply 104 is interfaced with these components as well as with an external power source in a well known manner using industry standard cabling and connections.

The unit 100 further includes a controller 39 including a tape cartridge loader controller 144 and a library storage controller 146 (FIG. 2), a tape cartridge loader controller slot 106 receiving the tape cartridge loader controller 144, and a library controller slot 108 receiving the library controller 146. The tape cartridge loader controller 144 may comprise a standard driver interface unit for receiving digital commands and translating the commands into driving currents, such as step pulses for controlling stepper motors. The library controller 146 may comprise a standard programmable general purpose computer formed on a single plug-in card unit and preferably includes a programmed microprocessor or microcontroller according to the present invention, memory, communication interface, control interface, connectors, etc. The input-output connections between the tape cartridge loader controller 144, the library controller 146 and the other components of the unit 100 may comprise well known industry standard cabling and communication protocols. For example, several implementations use common industry standards such as the 12C bus, RS422 or RS232. Cabling and electrical characteristics including signaling protocols can be generally standardized, the logical message protocols can be either proprietary or standardized as known to those skilled in the art.

Figure 3:
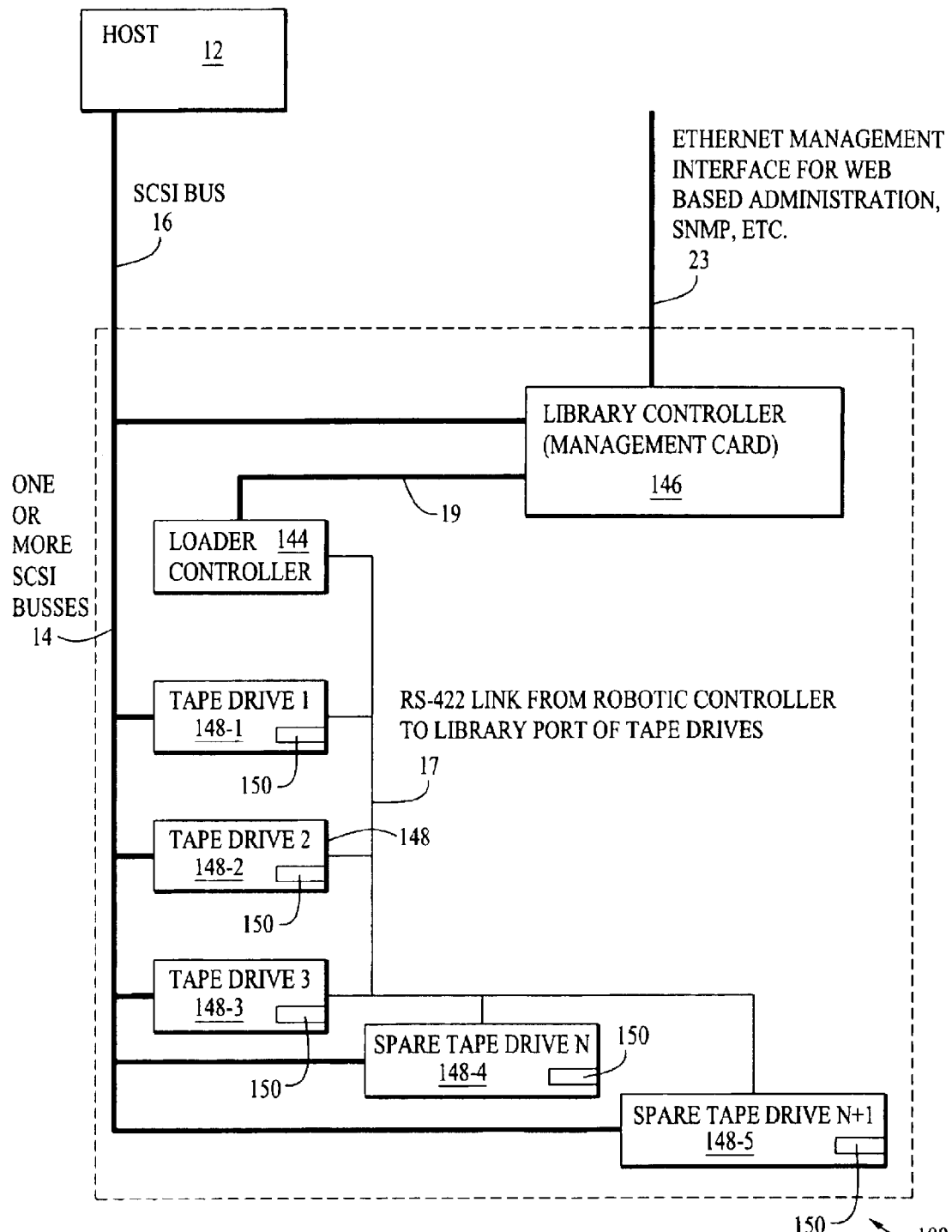
FIG. 3 is an example block diagram of another embodiment of a tape loader unit connected to a host computer via multiple bus structures.

Alternatively, the loader controller 144 may be included as circuitry within or on the library controller card 146. Furthermore, the mass storage and retrieval unit 100 may be operated by means of the cartridge loader controller 144 and library controller 146 for use in conventional data processing. Connections of the unit 100 to conventional bus structures are shown in FIGS. 2–3 and discussed hereinafter.

Each of the tape drive slots 110 receives a standard tape drive 148 such as, for example, a Quantum DLT2000XT (TM), DLT4000 (TM), or DLT7000 (TM) cartridge tape drive, or equivalent, which has been adapted to fit into the tape drive slots 110. Each tape drive 148 includes a tape cartridge slot 150 and a tape cartridge sensor 152 within the slot 150 which generates a tape cartridge presence signal. A stand-alone tape drive 148 may be adapted for use in the mass storage and retrieval unit 100 by removing the handle at the front of the drive 148, removing the bezel from the front of the drive 148, and installing the tape drive 148 onto a conventional mounting bracket that supports the tape drive 148 within the housing 102 and provides adequate alignment of the tape drive 148 relative to the other components of the unit 100. The tape drive 148 further includes a handle motor assembly and handle actuator and transmission to provide automatic actuation of the tape drive door under the control of the tape cartridge loader controller 144 and/or library controller 146. The handle motor assembly may comprise a stepper motor or DC servo motor. The handle actuator and transmission may comprise any conventional transmission for converting rotation of the output shaft of the assembly into rotation and translation of the tape drive door.

Each of the tape cartridge magazine slots 112 receives a standard tape cartridge magazine 156 such as, for example, a Quantum TK85-M seven cartridge magazine adapted for use in the mass storage and retrieval unit 100. This cartridge is shown, for example, in U.S. Pat. No. 5,231,552 entitled: "Magazine and Receiver for Media Cartridge Loader", the disclosure thereof being incorporated herein by reference. The tape cartridge magazine 156 includes one or more tape cartridge slots 158, a tape cartridge presence flag 160 within each slot 158 which provides an indication of the presence or absence of a tape cartridge, and a release lever 162 for each slot 158. The standard tape cartridge magazine 156 as described in U.S. Pat. No. 5,231,552 may be adapted by removing the handle from the top of the magazine 156, adding a handle to the side, and modifying the lever lock by adding a one-way spring gate to force the guide pin to follow the proper path and thereby prevent incorrect manual operation when the magazine 156 is laid on its side.

As shown in FIG. 1 the tape cartridge elevator 114 is positioned within the housing 102 between the plurality of tape drive cartridge slots 150 and the plurality of tape cartridge magazine slots 112. In this manner, the tape cartridge elevator 114 is able to load and unload tape cartridges to and from all of the tape drives 148 and tape cartridge magazines 156. The tape cartridge elevator 114 is actuated in the directions indicated by the arrows 164 by the tape cartridge elevator motor 122 and pulley drive assembly 124 under the control of the tape cartridge loader controller 144 and library controller 146. The pulley drive assembly 124 includes a cartridge drive motor pulley 166, a short drive belt 168, an elevator drive pulley 170, a long drive belt 172, and an elevator idler pulley 174. The tape cartridge elevator 114 is slidably mounted upon at least one tape cartridge elevator guide shaft 116 and removably attached to the long drive belt 172 of the pulley drive assembly 124 at a connection point 176. The tape cartridge drive motor pulley 166 is rigidly attached to the output shaft of the tape cartridge drive motor 122. The elevator drive pulley 170 and the elevator idler pulley 174 are rotatably supported by the left and right side walls of the housing 102. The short drive belt 168 is mounted on and between the tape cartridge drive motor pulley 166 and the elevator drive pulley 170 while the long drive belt 172 is mounted on and between the elevator drive pulley 170 and the elevator idler pulley 174.

Under the control of the tape cartridge loader controller 144 and library controller 146, the tape cartridge elevator motor 122 rotates the tape cartridge drive motor pulley 166. Rotation of the tape cartridge drive motor pulley 166 in turn rotates the elevator drive pulley 170. Rotation of the elevator drive pulley 170 in turn causes the long drive belt 172 to move about the elevator drive pulley 170 and the elevator idler pulley 174. As a result of this arrangement, the tape cartridge elevator 114 translates in the direction indicated by the arrows 164 when the tape cartridge elevator motor 122 is rotated under the control of the tape cartridge loader controller 144 and library controller 146 by virtue of the connection 176 with the long drive belt 172.

The tape cartridge elevator motor 122 may comprise any controllably positionable motor such as, for example, a stepper motor, a servo motor, or a DC motor. The pulley drive assembly 124, which converts rotation of the output drive shaft of the tape cartridge elevator motor 122 into translation of the tape cartridge elevator 114, may be replaced with equivalent means such as, for example, a lead screw driven directly by the tape cartridge elevator motor 122 with the tape cartridge elevator 114 including a suitable connection threadadly mounted onto the lead screw, or alternatively, the elevator drive pulley 170 may be driven directly from the output shaft of the tape cartridge elevator motor 122 thereby eliminating the need for the short drive belt 168. Other similar alternative means for converting a rotational input into a translational output may also be used in the present embodiment.

The roller drive shaft 118 is rotatably supported at opposite ends by the top side wall 134 and bottom side wall 136 of the housing 102. The roller drive shaft 118 further passes through and is operably coupled to the tape cartridge elevator 114. The roller drive shaft 118 is rotated by the roller drive shaft motor 126 and roller drive shaft coupling assembly under the control of the tape cartridge loader controller 144 and library controller 146. The roller drive shaft coupling assembly driven by motor 126 may comprise any conventional transmission for coupling a rotary input to a rotary output which may include belts and pulleys, a gear train, or some combination of both.

The rack drive shaft 120 is rotatably supported at opposite ends by the top side wall 134 and bottom side wall 136 of the housing 102. The rack drive shaft 118 further passes through, and is operably coupled to, the tape cartridge elevator 114. The rack drive shaft 120 is rotated by the rack drive shaft motor 130 and a rack drive shaft coupling assembly coupled to the motor 130 which operates under the control of the tape cartridge loader controller 144 and library controller 146. The rack drive shaft coupling assembly driven by motor 130 may comprise any conventional transmission for coupling a rotary input to a rotary output which may include belts and pulleys, a gear train, or some combination of both. The roller drive shaft motor 126 and rack drive shaft motor 130 may comprise any controllably positionable electric motor such as, for example, a stepper motor, a servo motor, or a DC motor. In a one embodiment, the roller drive shaft motor 126 and rack drive shaft motor 130 are stepper motors and are further positioned immediately adjacent one another.

Referring to FIG. 2, an embodiment of the tape loader unit (tape library) 100 is shown connected to a host computer 12 via a bus structure 14, such as a "Small Computer System Interface-2" (SCSI-2) bus, in which the host system 12 acts as an initiator, and the unit 100 acts as a series of targets. In one example, a single SCSI ID path extends between the bus 14 and the tape drives 148 (e.g.,148-1, 148-2, 148-3) and the library controller 146, located within the library 100. The SCSI interface is described in "Working Draft X3T9.2 Project 375D, Information Technology—Small Computer System Interface—2" proposed by American National Standard of Accredited Standards Committee X3 (ANSI). Section 17 of the draft standard specifies a SCSI-2 bus architecture and command repertoire for "Medium-changer devices", such as the multi-cartridge tape library unit 100 shown in FIG. 1.

In the FIG. 2 example, each tape drive 148 (e.g.,148-1, 148-2, 148-3,148-4, 148-5) is assigned a unique SCSI ID, and the library controller 146 has its own unique SCSI ID. A considerable number of "initiators" and "targets" are supported by the SCSI-2 bus convention, as by implementation and use of the LUN suffixes within each SCSI ID number. In another version shown in FIG. 3, the library controller 146 has its own unique SCSI ID on e.g. a second SCSI bus 16. Both of the buses 14 and 16 are serviced by the host computer 12. Yet, in another version (not shown), one of the drives (e.g. drive 148-3) can provide an internal path between the SCSI bus 14 and the library controller 146, wherein the library controller 146 is identified as having the same SCSI ID address as drive 148-3, and also a suffix address known as a "Logical Unit Identifier". Communications between the host system 12 and the drive 148-3 which include the LUN, e.g. LUN#1, will pass to the library controller 146 and be decoded and acted upon.

In accordance with the SCSI-2 industry standard, the library 100 receives, decodes, executes and responds to each command, comprising a command descriptor block (CDB), from the host system 12. In one version, commands unique to medium changer devices, such as the library controller 146 of the unit 100 can include, for example: CHANGE DEFINITION, EXCHANGE MEDIUM, INITIALIZE ELEMENT STATUS, INQUIRY, LOG SELECT, LOG SENSE, MODE SELECT, MOVE MEDIUM, POSITION TO ELEMENT (DRIVE OR STORAGE SLOT) PREVENT ALLOW MEDIUM REMOVAL, READ BUFFER, READ ELEMENT STATUS, RECEIVE DIAGNOSTIC RESULTS, RELEASE, REQUEST VOLUME ELEMENT ADDRESS, REQUEST SENSE, RESERVE, REZERO UNIT, SEND DIAGNOSTIC, SEND VOLUME TAG, TEST UNIT READY, and WRITE BUFFER. These commands are defined in the ANSI draft specification, and the interested reader is directed to that specification for further details.

One command, EXCHANGE MEDIUM, is explained below in some detail. This command provides a way for the host system 12 to cause the unit 100 to move a storage medium (tape cartridge) from a source location to a destination location. The source location may be a particular slot 112 having a unique logical location. The destination may be a particular slot 150 of a specified tape drive, e.g. tape drive 148-1 within the library unit 100. Multiple destinations may be specified. For example, the structure of said command supports a host command including a source address corresponding to a e.g. a slot 112, and a destination address corresponding to a tape drive (e.g., 148-1) specified by the host computer 12.

Referring to FIGS. 1–3, when the EXCHANGE MEDIUM command is received from the host system 12 and acted upon by the library controller 146, the library controller 146 determines if the tape drive identified by the command (e.g., 148-1) is available. If the tape drive 148-1 is available, the elevator 114 moves to the source slot location 112 and checks to see if the tape cartridge specified in the command is present. If the cartridge is present, it is translated into the elevator 114 from the source slot 112. The elevator 114 then moves the cartridge to a position opposite the slot 150 of the tape drive 148-1, and proceeds to transfer the cartridge into the slot 150 of the host-selected drive 148-1. The cartridge is loaded and accessed by the tape drive 1481 in conventional fashion in accordance with subsequent commands sent from the host system 12 to the tape drive 148-1 to read or write data from or to the tape medium in the cartridge. When the host system 12 has completed operations with the particular cartridge, the cartridge may be returned to its storage slot in accordance with another EXCHANGE MEDIUM command, which specifies the tape drive 148-1 as the source location, and the original slot 112 as the final destination location.

According to an aspect of the present invention, one or more tape drives 148 (e.g., 148-4,148-5) are reserved as spare tape drives (spare data storage drives) and are masked from the host system 12 such that the spare tape drives are not directly accessible by the host system 12. When the host system 12 dispatches a medium-changer command, such as EXCHANGE MEDIUM command (including a source storage media slot location and a final logical drive address of a specified drive), the library controller 146 locates the source address and the final destination address and determines if a tape drive (e.g., 148-1) specified by the destination address is available. If the specified tape drive is not available (e.g., failed), the library controller 146 performs a "failover process" by using a spare tape drive (e.g., 148-5) in place of the specified tape drive (e.g., by redirecting the host command from the specified tape drive 148-1 to the spare tape drive 148-5, and controlling the loader 114 for moving a requested tape cartridge at the storage slot location 112 to the spare tape drive 148-5 instead of the tape drive 148-1).

Figure 4:
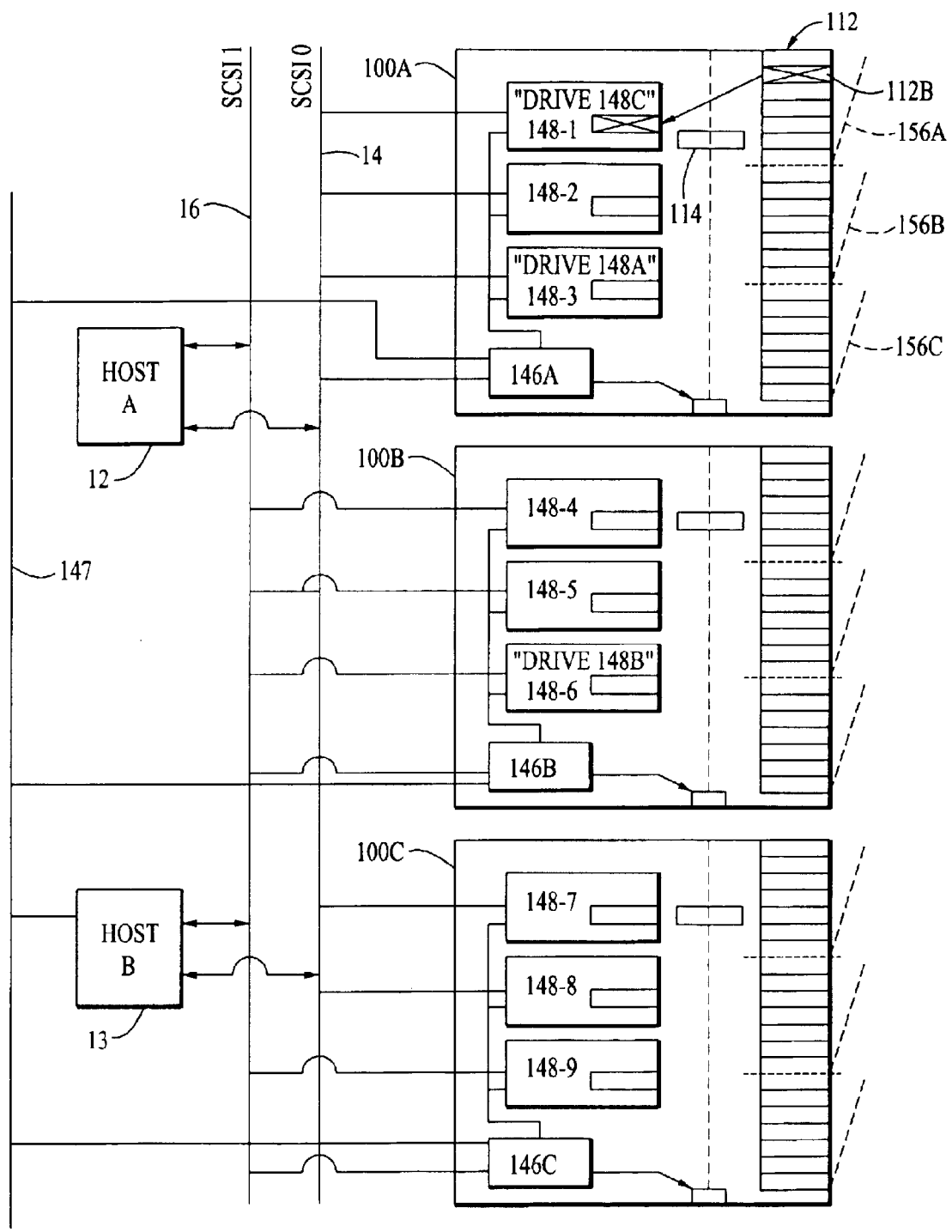
FIG. 4 is an example block diagram of another embodiment of a tape loader unit connected to a host computer via multiple bus structure.

Referring to FIG. 4, in another version, one or more library units 100 are configured and operate in accordance with principles of the present invention. In the FIG. 4 example, there are multiple library units 100A, 100B, 100C attached to one or more bus structures, such as SCSI-2 buses 14 and 16, and there are one or more host systems (e.g., host systems 12 and 13), acting as initiators on these buses. Each unit 100 has a library controller 146 (e.g.,146A, 146B, 146C) which is effectively attached to the bus 14 or 16, and has its own logical address. The units 100A, 100B and 100C are substantially identical, except that the library controller elements 146A, 146B, 146C have their own unique logical addresses.

In one example operation, when a host dispatches a medium-changer command to unit 100A, such as EXCHANGE MEDIUM command, the library controller 146A locates the source address and the final destination address and determines if the tape drive specified by the destination address is available. If the specified tape drive is not available (e.g., failed), the library controller 146A uses a spare tape drive in place of the specified tape drive. The status 'available' herein includes e.g. the lack of any indication that the tape drive is unavailable, implying generally that there is no indication of tape drive malfunction, and that the tape drive explicitly indicates it is in good working order. 'Unavailable' is an indication of one of the following, and other, conditions/events including:

The tape drive "ready to load" indicator is in the false state

The tape drive Power On Self Test (POST) failed

The tape drive Basic Health Check (BHC) indicates failure

Negative/failure response to a "Send Diagnostic" command

"Cleaning required" indication

Excessive read/write retry statistics for a given tape drive

Tape drive not present (if the tape drive has been removed for maintenance)

Referring to the FIG. 4 example, a physical tape drive 148-1 is reserved as a spare tape drive. An EXCHANGE MEDIUM command issued by a host system 12 or 13 may specify a source address as slot 112B and a destination address as logical drive "148C". The logical address drive "148C" may nominally translate to a physical drive 148-3. Upon decoding of this host command, the library controller 146A determines if the specified physical drive 148-3 is available. If the physical drive 148-3 is available, then the loader 114 loads the requested tape cartridge in slot 112B into the specified tape drive 148-3, as directed by the library controller 146A and/or loader controller 144. However, if the physical tape drive 148-3 is not available, using a failover process the library controller 146A uses a spare tape drive, such as physical tape drive 148-1, in place of the specified tape drive 148-3. In one example, the library controller 146A alters the logical address of physical drive 148-1 to become drive "148C" and the physical drive 148-1 thereupon intercepts and executes host commands directed to drive "148C" over the bus structure 14.

In the above example, in addition to changing the drive logical address, the controllers 146A and/or 144 cause the elevator 114 to move the tape cartridge from slot 112B to the spare physical tape drive 148-1. If the physical tape drive 148-1 were not ready at the time of the incoming host command, the library controller 146A can move the cartridge from slot 112B to another ready spare tape drive with a logical address changed to be drive "148C", and so forth.

Figure 5:
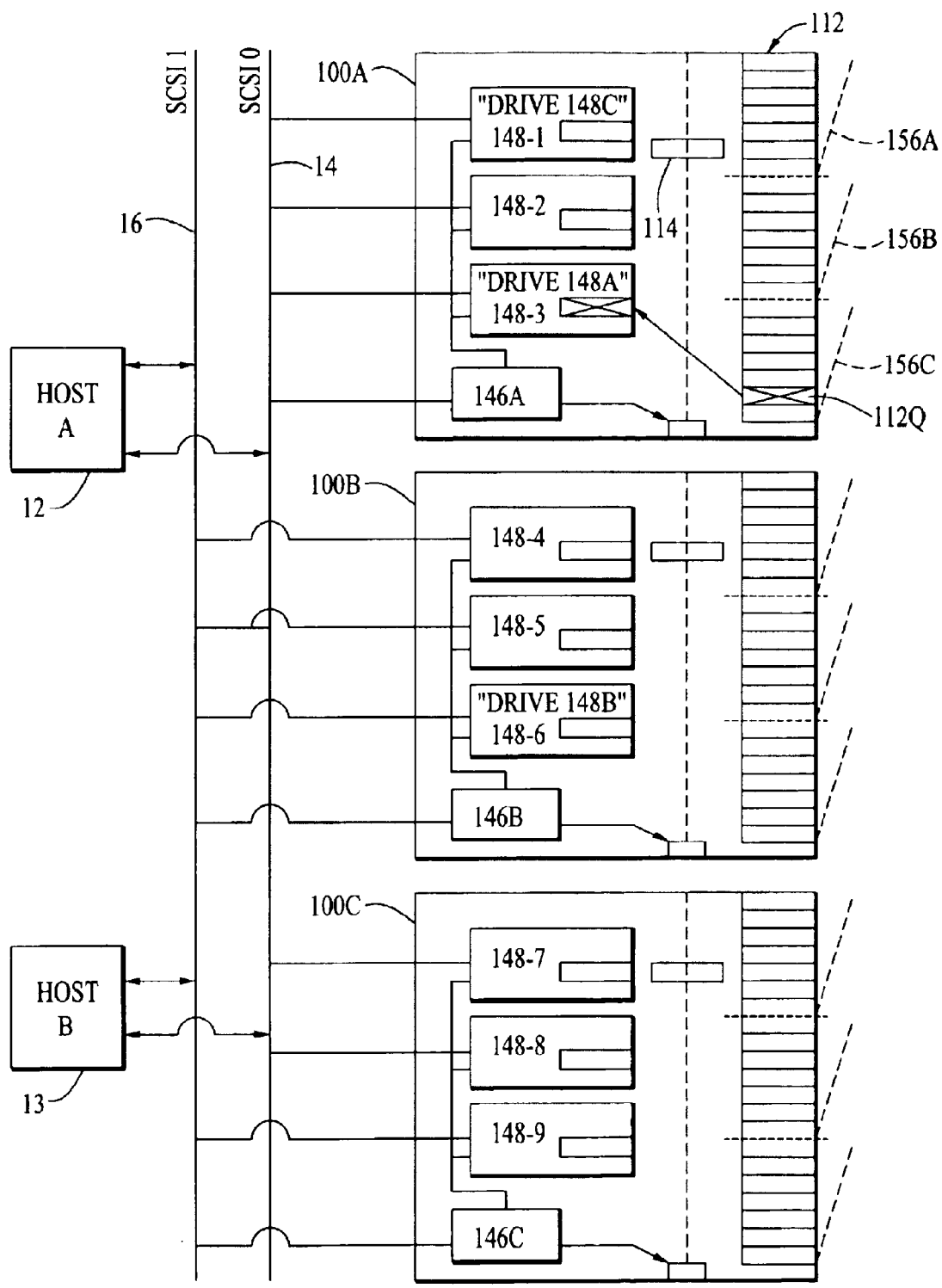
FIG. 5 is an example block diagram of yet another alternative embodiment a of tape loader unit connected to a host computer via multiple bus structures.

Referring to another example in FIG. 5, multiple library units 100 (e.g., 100A, 100B, 100c) are attached to, and supported by buses 14 and 16. The units 100A, 100B, 100C are substantially, except that their library controllers 146A, 146B, 146C, respectively, have their own unique logical addresses. In this example, the physical drive 148-3 is reserved as a spare tape drive. A host system issues a command for access to a tape cartridge in a slot 112Q, with a drive element identification being drive "148A" which may nominally translate to a physical drive 148-1. In a similar fashion, the library controller 146A determines if the physical tape drive 148-1 is available. If the physical drive 148-1 is available, then the controllers 146A and/or 144 cause the requested tape cartridge from the slot 112Q into the specified tape drive 148-1. However, if the physical driver 148-1 is not available, using a failover process the library controller 146A uses a spare tape drive, such as physical tape drive 148-3, in place of the specified tape drive 148-1. In one example, the library controller 146A alters the logical address of physical drive 148-3 to become drive "148A" and the physical drive 148-3 thereupon intercepts and executes host commands directed to drive "148A" over the bus structure 14. In addition to changing the drive logical address, the library controller 146A causes the elevator 114 to move the tape cartridge from slot 112Q to the spare physical drive 148-3. If the physical drive 148-3 were not ready at the time of the incoming command, the library controller 146A can move the cartridge from slot 112Q to another ready spare tape drive with a logical address changed to be drive "148A", and so forth.

In one implementation, the library controller 146 acts as both a SCSI target and a SCSI initiator, and all commands destined for the loader controller 144 flow through the library controller 146. This allows the library controller 146 to alter the host commands before they reach the loader controller 144. The library controller 146 can include several physically separate SCSI interfaces each acting as a loader controller target, and each wired independently to a separate host (e.g., hosts 12, 14). Because the host systems are on separate physical SCSI buses 14, 16 (e.g., SCSI 0, SCSI 1), the host systems are unaware of one another and cannot interfere with each other. The library controller 146 performs all arbitration of shared physical resources, and schedules commands to avoid conflicts. In another implementation, communicating to the loader controller 144 can be via other interconnections besides SCSI, or can collapse the library controller 146 and loader controller 144 into a single entity.

Referring back to FIGS. 2–3, the library controller 146 does not directly communicate with the tape drives 148 for determining drive availability (e.g., operation check) and ready to load queries. The library controller 146 issues special commands to the loader controller 144 via the communication link 19. In one version, the loader controller 144 uses a communication link 17 (e.g., RS422 bus) to communicate with the tape drives 148 on behalf of the library controller 146. The spare tape drives 148 (e.g., 148-4, 148-5) are masked them from the host system 12 by e.g. using the communication link 17 to hold the spare tape drive in a reset but uninitialized state such that the spare tape drives do not respond to host commands via the SCSI bus 14. The library controller 146 issues commands to the loader controller 144 to reconfigure both a host-specified tape drive that is determined to be unavailable and a spare tape drive in the event that a failover is necessary. The failed tape drive is placed in the reset, but unconfigured state, and the spare tape drive is configured to take over the SCSI address of the failed drive. In one example, the library controller 146 can export all management, status, and configuration information via an Ethernet interface 147 (FIG. 4), wherein the hosts 12, 13 may or may not have access to the interface 147.

Figure 6A:
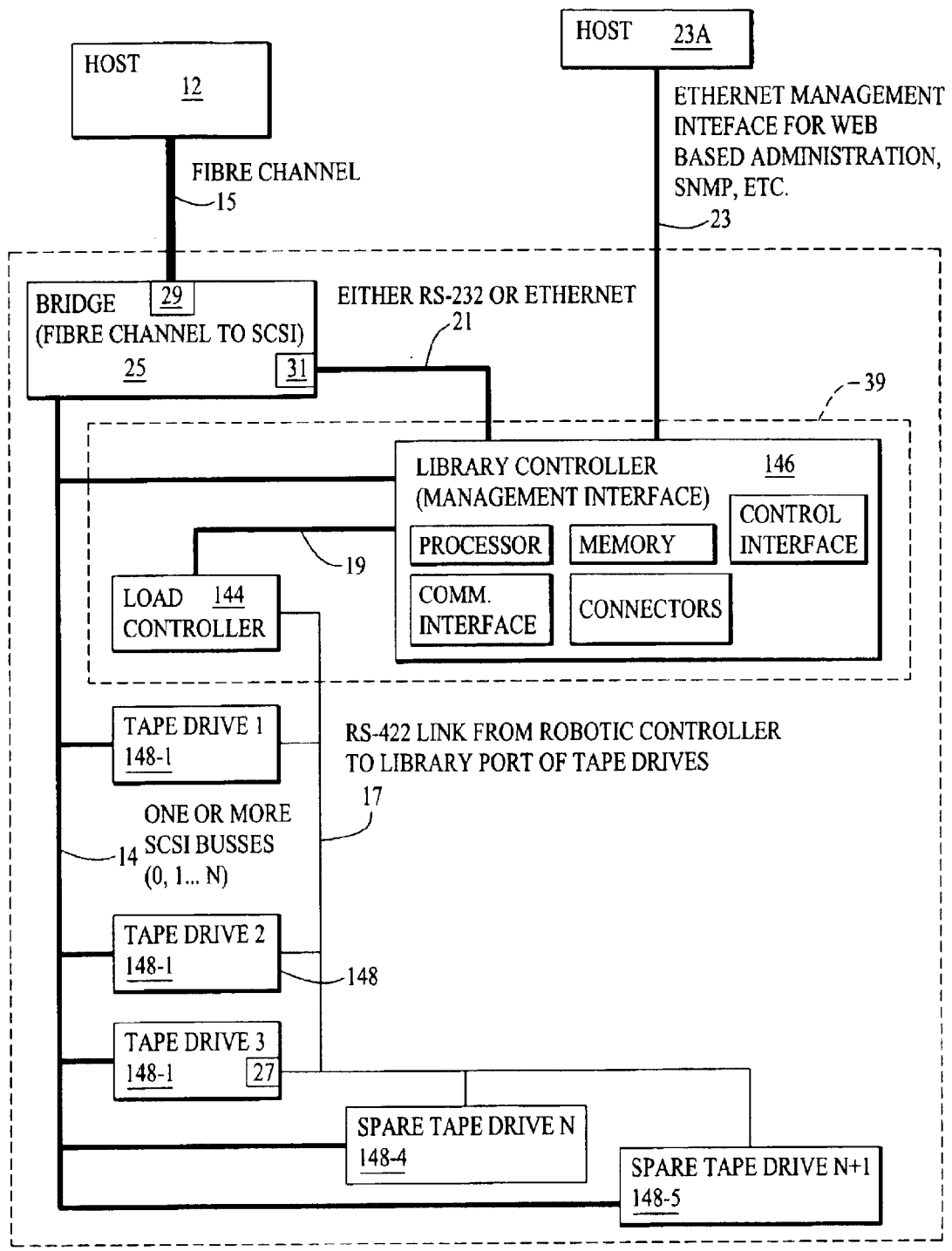
FIG. 6A is an example block diagram of another embodiment of a tape loader unit connected to a host computer via mixed bus structures.

Referring to FIG. 6A, another embodiment of the library unit 100 is shown connected to a host computer 12 via a bus structure including a fiber channel 15 connected to the bus 14 (e.g., "SCSI-2" bus). The host system 12 acts as an initiator and the unit 100 acts as a series of targets, using a bridge device 25 (e.g. fiber channel to SCSI bridge). In one example, a single SCSI ID path extends between the bus 14 and the tape drives 148 (e.g., 148-1, 148-2, 148-3, 148-4, 148-5). Each tape drive 148-1, 148-2, 148-3, 148-4, 148-5, is assigned a unique SCSI ID, and the library controller 146 has its own unique SCSI ID. A considerable number of "initiators" and "targets" are supported by the SCSI-2 bus convention, as by implementation and use of the LUN suffixes within each SCSI ID number. In another version the library controller 146 has its own unique SCSI ID on e.g. a second SCSI bus.

Fiber channel connections between a host computer (e.g., host system 12) and slave peripheral devices (e.g., tape drives 148-1, 148-2, 148-3, 148-4, 148-5), are designed to transport a large amount of data along routes, at very high speeds over relatively small distances with little software overhead once data transmission commences. A channel generally provides a direct or switched point-to-point connection between a master and a slave that is hardware-intensive. The Fiber channel Protocol ("FCP") is a protocol comprising a single Open-Systems-Interface-like OSI-like) stack architecture. Essentially, the Fiber Channel ("FC") is a multi-topology, multi-layer stack with lower-layer-protocols ("LLPs") for controlling the physical transport characteristics and upper-layer-protocols ("ULPs") for mapping LLP communication to and from higher-level software structures that are compatible with an Operating System. These ULPs include both channel and network protocols such as Intelligent Peripheral Interface ("IPI"), Small Computer System Interface ("SCSI"), and Internet Protocol ("IP"), among others.

Devices that engage in either channel or network communication may be categorized as "initiators" or "targets" or both, depending upon their functionality. Certain specific functions are assigned to either an initiator or a target: (i) an initiator can arbitrate for the communication path and select a target; (ii) a target can request the transfer of command, data, status, or other information to or from the initiator, and (iii) in some instances, a target can arbitrate for the communication path and reselect an initiator to continue a transaction. In Fiber Channel implementations, any device can be either an initiator, target, or both. In the example of FIG. 6A, the host system 12 is typically only an initiator and the bridge 25 is typically only a target (an exception is a bridge that implements the SCSI extended copy command, wherein such bridges act as both initiators and targets.)

For devices that are operable with the Fiber Channel Protocol, only those devices which have the initiator functionality may initiate what is known in the art as a Link Service Request or an Extended Link Service Request. Link Service commands provide Fiber Channel initiators with the ability to perform such tasks as Node Discovery, Abort Requests and Reject Communication frames.

In FIG. 6A a communication link 21 connects the library controller 146 and the bridge 25, wherein the communication link 21 can comprise e.g. either RS232 or Ethernet, depending on the design of the bridge 25. The bridge 25 is configured (e.g., via firmware) to provide masking of the spare tape drives 148-4, 148-5 from the host system 12 and perform dynamic reconfiguration. The bridge 25 includes a management port/interface 31 connected to the library controller 146 via the link 21, allowing the library controller 146 to reconfigure the bridge 25 for e.g. masking spare tape drives 148-4, 148-5 from the host system 12 and redirecting data flow routes between the host system 12 and the tape drives. There is no change in the number, type, or external address of the drives exported to the host system 12 by the bridge 25. In one example, the bridge 25 is configured such that redirecting data flow routes within the bridge 25 from a failed tape drive to a spare tape drive does not generate a topology change notification. As such, the bridge 25 need not perform a Loop initialization Protocol (LIP), a very disruptive procedure which notifies the host system 12 of a configuration change.

The spare tape drives are masked from the host interface (e.g., host bus adapter (HBA) within the host system 12), such that the spare tape drives are not reflected in the mode sense or read element status information returned to the host system 12 by the library controller 146. Typically a PCI card implements the Fiber Channel hardware interconnect. In response to a host command specifying a slot 112 and a tape drive 148, the library controller 146 checks to see if the specified tape drive is available. In one example, the library controller 146 uses a library interface 27 in each tape drive 148 (e.g., tape drive 148-3) via the loader controller 144 to poll the tape drive for its availability (e.g., status) prior to loading a tape into the tape drive. If the specified tape drive is not available (e.g., not in a ready to load state for any reason) the library controller 146 internally marks the tape drive as being "down" or failed, notifies any appropriate management interfaces, such as SNMP agents, of the failure, and transparently remaps/redirects the host operation to one of the spare tape drives.

Said library interface 27 in each tape drive 148 can comprise e.g. the library port of the tape drive 148, providing an interface designed to allow communication between the tape drive 148 and the library electronics (e.g. controller 144). For DLT tape drives, the library interface 27 comprises an RS422 port used for connection to the loader/robotic controller 144. The interface 27 allows the controller 144 to issue a limited command set to the tape drive 148, including commands such as "load", "unload", "reset", "set SCSI ID", "Query Ready to load state", "Query drive I/O retry statistics", "perform Basic Health Check", etc.

In one operational scenario, the redirection operation by the library controller 146 includes the steps of:

(1) The library controller 146 translates logical tape drive addresses within the library 100 so that host operations destined for a failed tape drive are automatically and transparently redirected to a spare tape drive in place of the failed drive. The library controller 146 processes every command descriptor block (CDB) destined for the loader controller 144, and the library controller 146 is configured to alter the CDB before passing it on. In particular, when the library controller 146 inspects each CDB, if it determines that the CDB would act upon a tape drive which in unavailable, the library controller 146 alters all logical addresses within the CDB that refer to the failed tape drive, replacing the logical addresses with the logical address of the spare tape drive which takes over the failed drive's duties.

(2) Using the library interface 27, the failed tape drive is reset and its SCSI interface de-activated. In one example, the library controller 146 commands the loader controller 144 to reset the failed tape drive using a "reset" command issued to e.g. the RS422 library interface 27 of the failed tape drive.

(3) The library controller 146 conditions the spare tape drive, wherein:

(a) In a parallel SCSI attached library (e.g., FIGS. 2–5), the SCSI ID of the spare tape drive is reprogrammed to match the ID of the failed tape drive; in SCSI attached libraries, the spare tape drives can reside on the same physical SCSI bus as the failed tape drive, or alternatively a SCSI cross-bar switch can be utilized to make the remapping transparent to the host system 12.

Figure 6B:
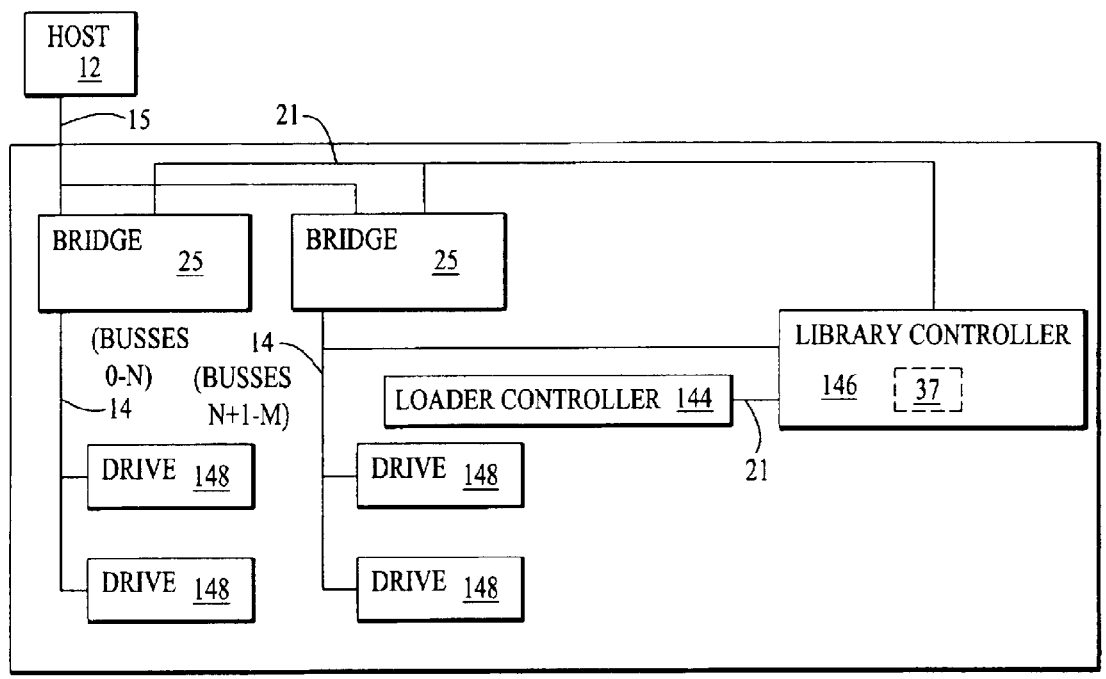
FIG. 6B is an example block diagram of another version of the loader unit including two bridges for connection to one or more host computers.

(b) In a library system utilizing one or more Fiber Channel bridges 25 (e.g., FIGS. 6A–C) each bridge 25 is reprogrammed to effect the remapping function (e.g., redirection of data transfer between the host and the failed tape drive to the spare tape drive) wherein the spare tape drives reside on the same bridge 25. Referring to FIG. 6B, in another version the library 100 includes two bridges 25, wherein only one bridge 25 is connected to the library controller 146 via the SCSI bus 14, and all other bridges 25 service only the tape drives 148. The library controller 146 is connected to all bridges 25 via the link 21 (e.g., RS232 or Ethernet).

Further to remapping the logical addresses of tape drives 148 within the library 100, and reconfiguring either the SCSI ID of a tape drive 148 or a "route" within a Fiber Channel to SCSI bridge 25, ongoing diagnostic health/operability check can be performed within the library. For example, when a tape drive 148 within the library 100 is in an unloaded state, it can be mapped out the same way as a failed tape drive and a spare tape drive used in its place, without affecting the host operation. While in this state, the mapped out tape drive may be subjected to diagnostic health checks e.g. using tapes reserved by the library controller 146 and hidden from the host system 12 for this purpose. Depending on the level of the diagnostics available, such procedure can be used for the purposes of predictive failure analysis. The procedure can be repeated in round-robin style to affect health checks on all the tape drives 148 of the library 100 without impacting the host system 12. Further, transparently switching (mapping) tape drives within the library 100 can be used to effect wear leveling of the tape drives 148 within the library 100.

The fiber channel bridge 25 exposes to the host system 12 a set of devices (e.g., tape drives 148) on a fiber channel interface 29 of the bridge 25, thereby allowing the host system 12 to interact with the devices. These devices are given Fiber Channel addresses, which can be implemented by the bridge 25 and may bear no correlation to the actual physical address of the devices on the SCSI bus attached to the bridge 25. The bridge 25 exports a set of "routes", mapping a SCSI BUS:ID:LUN address to a Fiber Channel Port:LUN address. Typically routes are established by sequentially polling the SCSI buses for each ID and LUN combination, and assigning consecutive LUN addresses for each device found on the primary Port address of the fiber channel interface 29. An alternate method includes the steps of allowing a user to set up the address mapping using the management interface 31 in the bridge 25. This mapping is then stored in persistent memory within the bridge 25 and used whenever the bridge 25 is powered on. Special commands are incorporated within the bridge management interface 31 in the bridge 25 to allow the library controller 146 to dynamically alter the mapping/routes in the bridge 25.

Figure 6C:
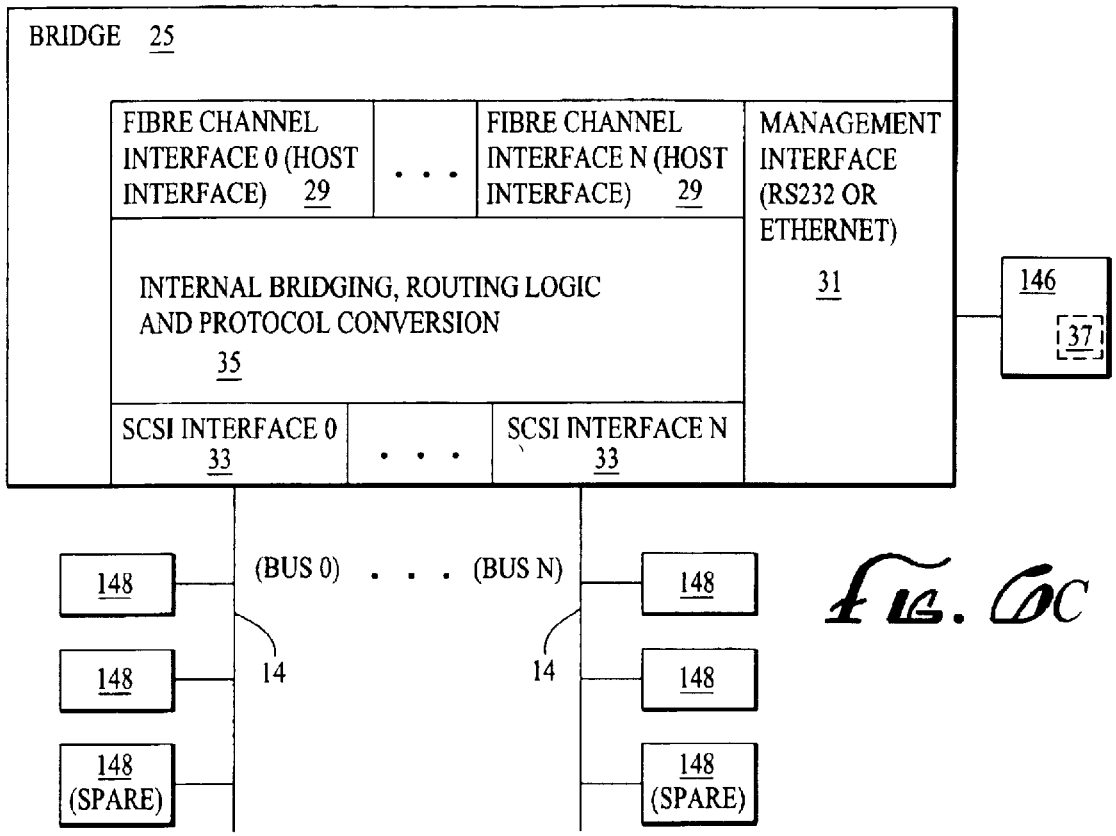
FIG. 6C is an example block diagram of another version of the loader unit including fiber channel and SCSI buses, for routing of data between a host and storage drives via fiber channel bridge applications and SCSI buses.
Figure 6D:
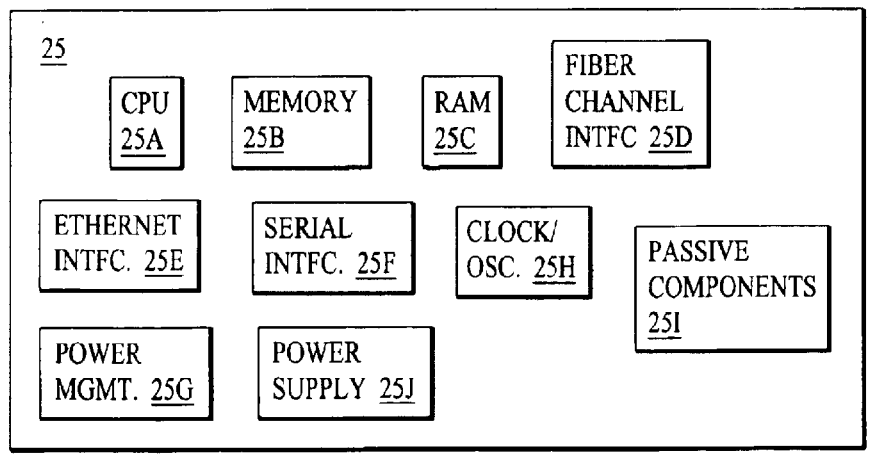
FIG. 6D shows as example block diagram of an embodiment of a bridge device.

Referring to FIG. 6D, an example bridge 25 can comprise: (1) a processor or CPU 25A such as the Intel i960 (TM) or Motorola PowerPC (TM), memory 25B (e.g., RAM) for I/O buffers and program execution, (2) Flash RAM 25C for program and configuration storage, (3) SCSI interface chip such as the Symbios Logic 875,876,895,896 (TM), (4) Fiber Channel interface chip 25D such as the Qlogic (TM), (4) Ethernet management interface 25E such as the Intel 82559 (TM), (6) Serial console interface chips 25F such as the National 16550 (TM), (7) Power regulation hardware 25G, (8) clock/oscillators 25H, (9) various passive components 25I, and (10) Power supply 25J. The bridge 25 further includes bridge software for: (1) protocol conversion and routing algorithms, (2) SNMP management, and (3) Configuration and user interface. The bridge software includes instruction stored in the bridge memory for execution by the bridge processor. The bridge 25 can further include "auto-mapping" algorithms to scan all SCSI busses and establish routes for all devices (e.g., tape drives) present. The bridge 25 can also include provisions for "fixed addressing", where the user inputs the routes manually, and the routes are stored in persistent memory.

Said special commands allow dynamic changes to mapping/routing tables in the bridge 25 without topology change notification. The masking operation is performed by disabling the "auto-mapping" feature, and allowing the library controller 146 program routes in the bridge 25 using standard "fixed addressing" facilities at startup time. The library controller 146 is responsible for not establishing routes for the spare tape drives. Upon detecting failure of a e.g. host-selected tape drive via health check, the library controller 146 issues a new "alter-route" command, to alter the route to the failed tape drive to utilize the target address of one of the spare tape drives.

Tape drive health checks can be performed e.g. by either a tape drive 148 itself, or by the library controller 146 via special "pass through" commands issued to the bridge 25 via the Bridge's management interface 29. The bridge 25 pass-through command allows the library controller 146 to direct the bridge 25 to issue an arbitrary SCSI command to any device (e.g., tape drive) attached to the bridge's SCSI bus on behalf of the library controller 146. Built-in health check features of e.g. DLT7000/8000 tape drive include: send diagnostic command, ready to load indicator, basic health check command, and the error statistics for read and write errors.

Some diagnostics, such as the basic health check and ready to load indicator, are binary in nature, wherein a tape drive 148 is considered either "good" or "bad". If the tape drive 148 is good, no indication of how close to becoming bad is given. More sophisticated diagnostic routines can be employed which track retry and soft error rates over time, as well as tape drive characteristics such as tape tension and signal amplitude, to determine both whether or not the tape drive is usable, as well as give an indication of how close to failure the tape drive is.

Referring back to FIGS. 6A–C, data routing is utilized in the bridges 25 for transparent drive failover to allow data destined to the failed tape drive to be sent to a spare tape drive. In the example bridge 25 of FIG. 6C, routing of tape drive data is provided via fiber channel bridge applications 35 for routing data between the fiber channel interface(s) 29 (e.g., Fiber Channel interfaces 0, 1 . . . N) and the parallel SCSI interface(s) 33 (e.g. SCSI interfaces 0, 1 . . . N) connected to SCSI busses 14 (e.g., SCSI bus 0 . . . N). In the example of FIG. 6C, the Fiber Channel interface 0 has port ID 89 and the Fiber Channel interface 1 has port ID 125, with the library controller 146 at SCSI ID 0 LUN 0 on SCSI interface 0, and tape drives 148 at the following addresses:

Bus 0, ID 4, LUN 0 Bus 1, ID 4, LUN 0 Bus 2, ID 2, LUN 0

Bus 0, ID 5, LUN 0 Bus 1, ID 5, LUN 0 Bus 2, ID 3, LUN 0

One example of many valid mappings/route definitions can be as follows:

Fiber Channel Interface 0, Port 89, LUN 0 maps to SCSI bus 0, ID 0, LUN 0, the library controller 146

Fiber Channel interface 0, Port 89, LUN 1 maps to SCSI bus 0, ID 4, LUN 0, a tape drive 148

Fiber Channel interface 0, Port 89, LUN 2 maps to SCSI bus 0, ID 5, LUN 0, a tape drive 148

Fiber Channel interface 0, Port 89, LUN 3 maps to SCSI bus 1, ID 4, LUN 0, a tape drive 148

Fiber Channel interface 0, Port 89, LUN 4 maps to SCSI bus 1, ID 5, LUN 0, a tape drive 148

Fiber Channel interface 1, Port 125, LUN 0 maps to SCSI bus 2, ID 2, LUN 0, a tape drive 148

Fiber Channel interface 1, Port 125, LUN 1 maps to SCSI bus 2, ID 3, LUN 0, a tape drive 148

In order to mask a tape drive from the host system 12, any mapping or route from the Fiber channel interface(s) 29 to the SCSI target tape drive is prevented. For example, to mask the tape drive on SCSI bus 1, ID 4, LUN 0 in the previous example, the routes are altered as follows:

Fiber Channel Interface 0, Port 89, LUN 0 maps to SCSI bus 0, ID 0, LUN 0, the library controller 146

Fiber Channel interface 0, Port 89, LUN 1 maps to SCSI bus 0, ID 4, LUN 0, a tape drive 148

Fiber Channel interface 0, Port 89, LUN 2 maps to SCSI bus 0, ID 5, LUN 0, a tape drive 148

Fiber Channel interface 0, Port 89, LUN 3 maps to SCSI bus 1, ID 5, LUN 0, a tape drive 148

Fiber Channel interface 1, Port 125, LUN 0 maps to SCSI bus 2, ID 2, LUN 0, a tape drive 148

Fiber Channel interface 1, Port 125, LUN 1 maps to SCSI bus 2, ID 3, LUN 0, a tape drive 148

Change in routes which alter the number or types of devices (e.g. tape drives) presented to a fiber channel interface 29 can cause a disruptive notification process (such as a LIP) to notify other systems that the Fiber Channel topology has changed. If the number of devices, their type, or the Fiber Channel port ID:LUN address of a devices changes, it would be a topology change requiring a change notification. However, according to the present invention, the pre-masking of the spare devices (i.e., spare tape drives) coupled with the swapping of equivalent devices in the failover cases allows the route modification to take place without notifying the fiber channel interface 29 of a topology change. Circumventing LIP is accomplished by masking of the spare tape drives (i.e., not configuring a route between the SCSI BUS:ID:LUN address and the Fiber Channel port ID:LUN), and by the subsequent altering of routes so that a logically identical spare tape drive (device) takes over the responsibilities of a failed tape drive (device), without changing the address as seen by the host system 12, nor the number or types of devices seen by the host system 12.

Where coupling several tape drives (e.g., more than two tape drives) to a single SCSI bus is undesirable (e.g., due to bandwidth constraints that limit the data routing capabilities of SCSI implementations), the higher bandwidth of fiber channel allows for several tape drives (e.g. ten tape drives) to be coupled to a single bridge 25 (fiber channel interface 29), enabling more flexible data routing. In SCSI environments (e.g., FIGS. 2–5), data routing can be accomplished through e.g. the use of a specialized cross bar switch.

In an example tape library which can accommodate 16 tape drives, there are 16 separate SCSI buses internally and the buses may be interconnected. Each bus supports two active tape drives, whereby there is a standby (spare) drive on each SCSI bus. As such, in this example there are a total of three tape drives per bus, two active and one spare, hidden from the host system 12.

In the fiber channel implementations (e.g. FIGS. 6A–C), the standard routing function of a fiber channel bridge 25 is modified to provide:

(a) Masking of the spare tape drives so that host application software is unaware of the presence of the spare tape drives and does not attempt to use the spare tape drives directly; and (b) Altering the fiber channel to SCSI mapping dynamically, without impact to the host systems (e.g., eliminating topology change notification and necessity of loop initialization protocol). A spare tape drive takes over the logical address of the failed tape drive, so that to the host system 12 no change in configuration is apparent.

Fiber Channel to SCSI bridges 25 provide interconnectivity necessary to allow reasonable overheads for failover protection. The combination of the interconnectivity of Fiber Channel (which supports several tape drives/Fiber channel connection, and a switched fabric of interconnected buses) and the distribution of the I/O redirection overhead (e.g. via either one tape drive assuming the identity of another tape drive on the same bus, or the existence of multiple Fiber channel bridges) makes the redirection of a I/O stream from a failed drive to a spare drive possible.

Figure 7B:
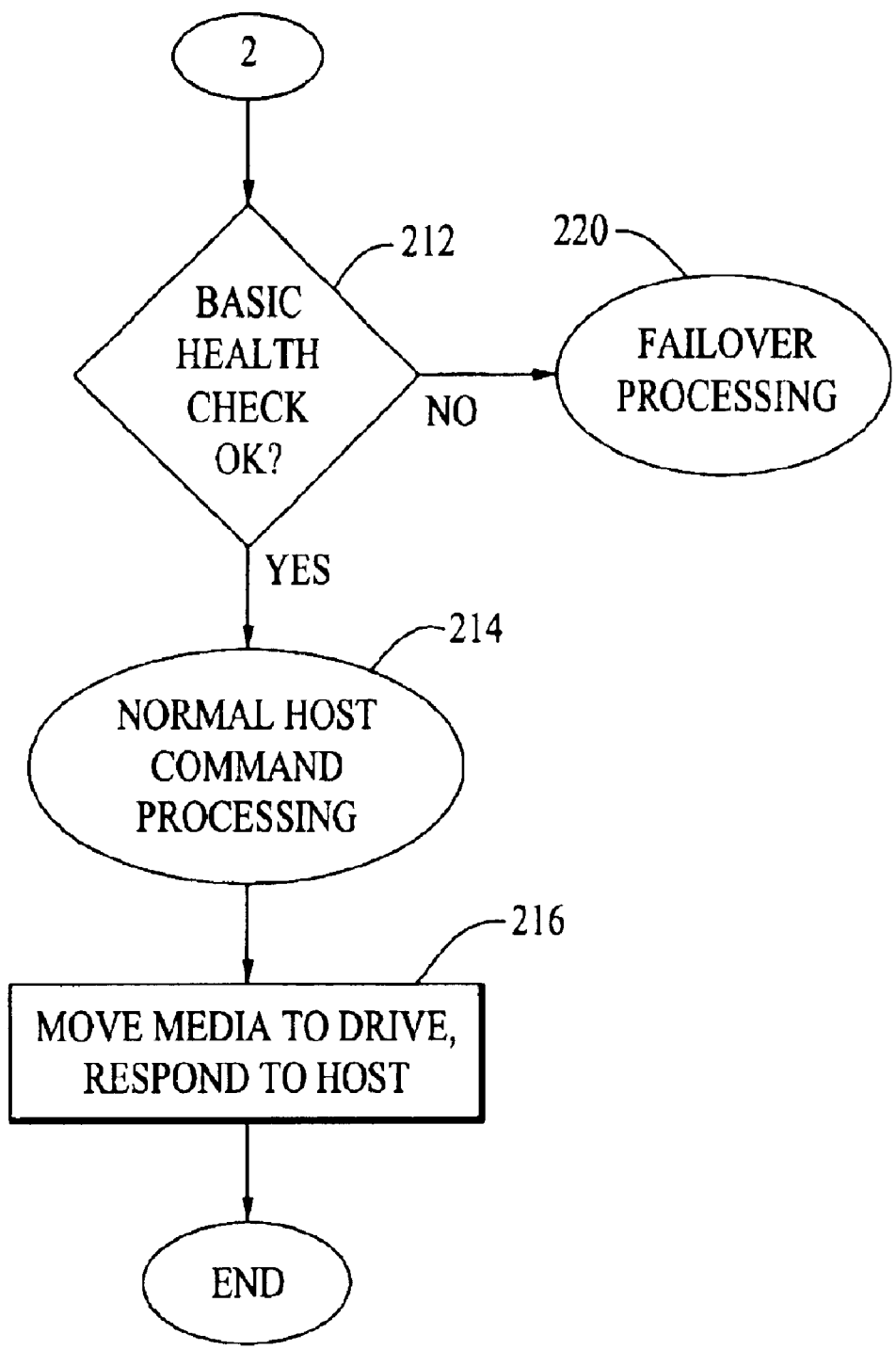
FIG. 7 is a flow diagram of a control process used by the library controller of the FIGS. 6A–C embodiments of the present invention.
Figure 7C:
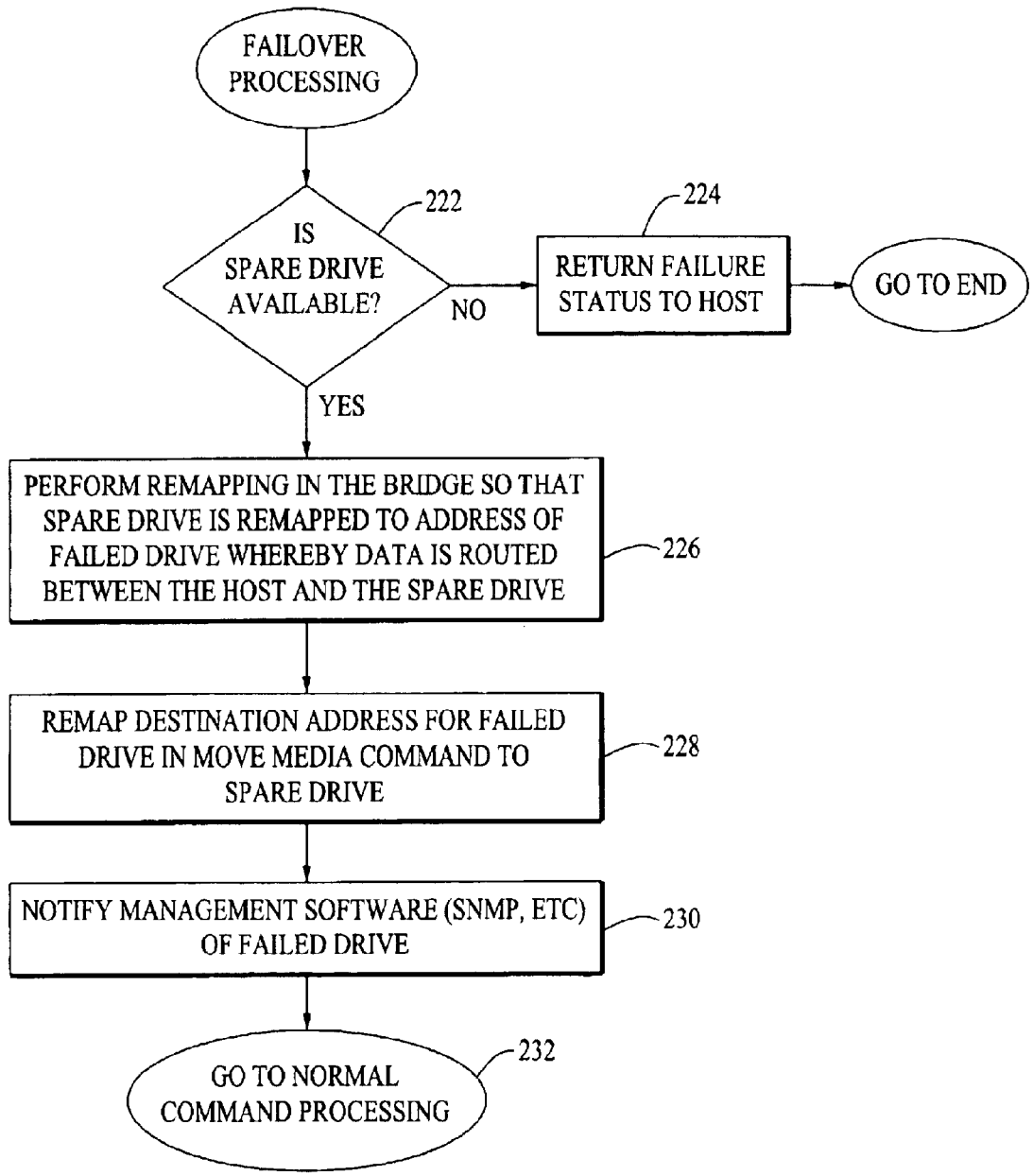

A flowchart of a control process implementing the present invention as executed e.g. by the library controller 146 within examples in FIGS. 6A–C is set forth in FIGS. 7A–C. A power on start step 200 is performed which initializes the library 100 into an operative state. A related initial step includes taking an inventory of cartridges against slot locations. The inventory may be by any conventional fashion, such as optically scanning a bar code affixed to each cartridge in order to ascertain and record e.g. a unique volume tag and associate the volume tag with the slot logical address. The inventory also includes an inventory of available active elements, such as the tape drives.

The library controller 146 then configures the bridge 25, including reserving one or more of the tape drives as spare tape drives, and establishing normal routes in the bridge 25 to the remaining tape drives (step 202). The library controller 146 configures the library 100 as a virtual library by masking (hiding) the spare tape drives from the host system 12 (step 204). In one version (e.g., fiber channel-SCSI, FIGS. 6A–C), to reserve a spare drive, the spare tape drive is masked from the Fiber Channel interface, (i.e. no route defined from the Fiber channel interface to the physical SCSI address of the spare drive (hot spare)). In another version (e.g., SCSI only, FIGS. 2–5), the library controller 146 masks the spare tape drives by intercepting and altering the responses to the "Mode Sense" and "Read Element Status" commands. Because the library controller 146 acts as an intermediary between the host system 12 and the loader controller 144, the library controller 146 can alter both commands (CDB) from the host system 12 and responses to the host system 12. In particular, the Mode Sense command to the library 100 returns geometry information from the library 100, including the number of tape drives installed. This number is altered to subtract the spare tape drives. Likewise, the Read Element Status response is altered to not return element status for the spare tape drives.

The library controller 146 then receives and decodes host commands such as a move media command including a destination address identifying a tape drive (step 206). If the command is e.g. an EXCHANGE MEDIUM command, the library controller 146 scans the identified tape drive e.g. via the loader controller 144 using the library interface port 27 of the tape drive to determine if the tape drive is ready to load in order to execute the command (step 208). If the tape drive is ready to load (step 210), and the tape drive is operational (e.g., healthy) (step 212) then the library controller 146 follows normal command processing (wherein e.g. the CDB from the host system 12 is passed unaltered to the loader controller 144, and the response from the loader controller 144 is passed unaltered back to the host system 12) (step 214). The library controller 146 then directs the loader controller 144 to control the loader 114 to move the requested tape cartridge into the identified tape drive, and respond to the host system 12 (step 216).

If in step 210 the identified tape drive is not ready to load, the library controller 146 begins 'failed drive processing' (step 218). Similarly, if in step 212, the identified tape drive is not operation, the library controller 146 begins 'failed drive processing' (step 220). The library controller 146 maintains an internal state table 37 representing the allocation of spare drives, as well as the mapping of spare tape drives to failed tape drives. Referring to FIG. 7C, 'failed drive processing' includes using the state table 37 to determine if a spare tape drive is free for use (step 222). If not, a failure status is returned to a host system (step 224). If other spare tape drives exist, the library controller 146 can check if any of one them is free, and return a failure status to the host if none of the spare tape drives are free.

If a spare tape drive is free, then the library controller 146 commands the bridge 25 to remap the spare tape drive to the address of the failed drive so that data is routed between the host system 12 and the spare tape drive (step 226). The structure of the controller command can vary among different bridges 25, wherein e.g. the library controller 146 commands the bridge 25 to alter its internal routes, replacing the route for the failed tape drive with a route to one of the spare tape drives (whichever one the library controller 146 chooses). In one example, this is accomplished via the "alter-route" command to the bridge 25, discussed herein. The library controller 146 further remaps destination address for the failed tape drive in the move media command to the address of the spare tape drive so that the loader controller 144 loads the requested tape cartridge into the spare tape drive (step 228). The library controller 146 can further notify a management software (e.g., SNMP) of the identity of the failed tape drive for reporting and repairs (step 230). Thereafter, the library controller 146 proceeds with normal command processing (step 232). The management software can include two major components: an "agent" software residing on the library controller 146 itself, and a main software residing on a host 23A connected to the library controller 146 via the Ethernet network 23 (FIG. 6A). The agent is configured with the address(es) of the hosts 23A which are to be notified of failure events, and the agent is responsible for monitoring the state of the library system.

Figure 8A:
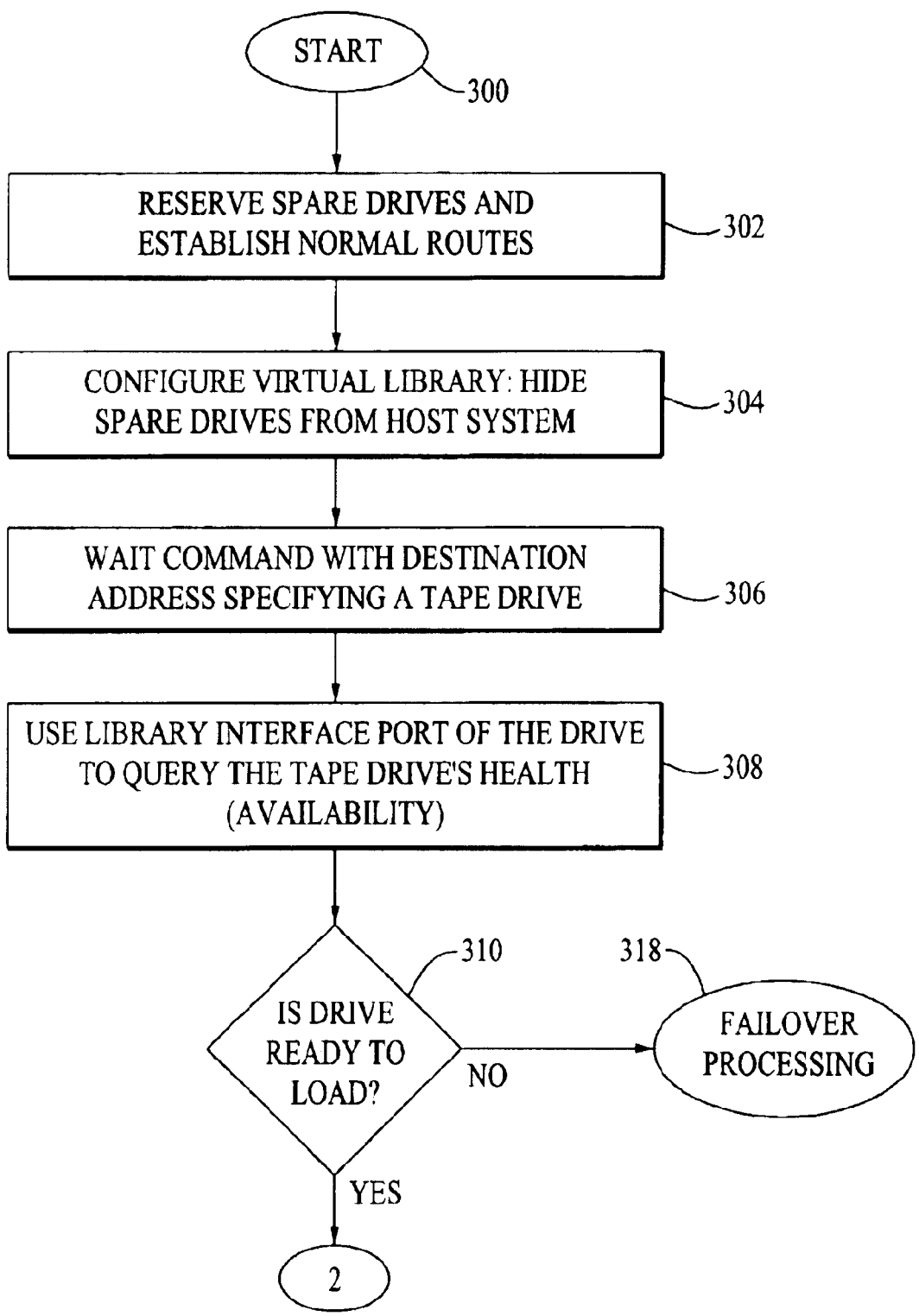
FIG. 8 is a flow diagram of a control process used by the tape loader controllers of the FIGS. 2–5 embodiments of the present invention.
Figure 8B:
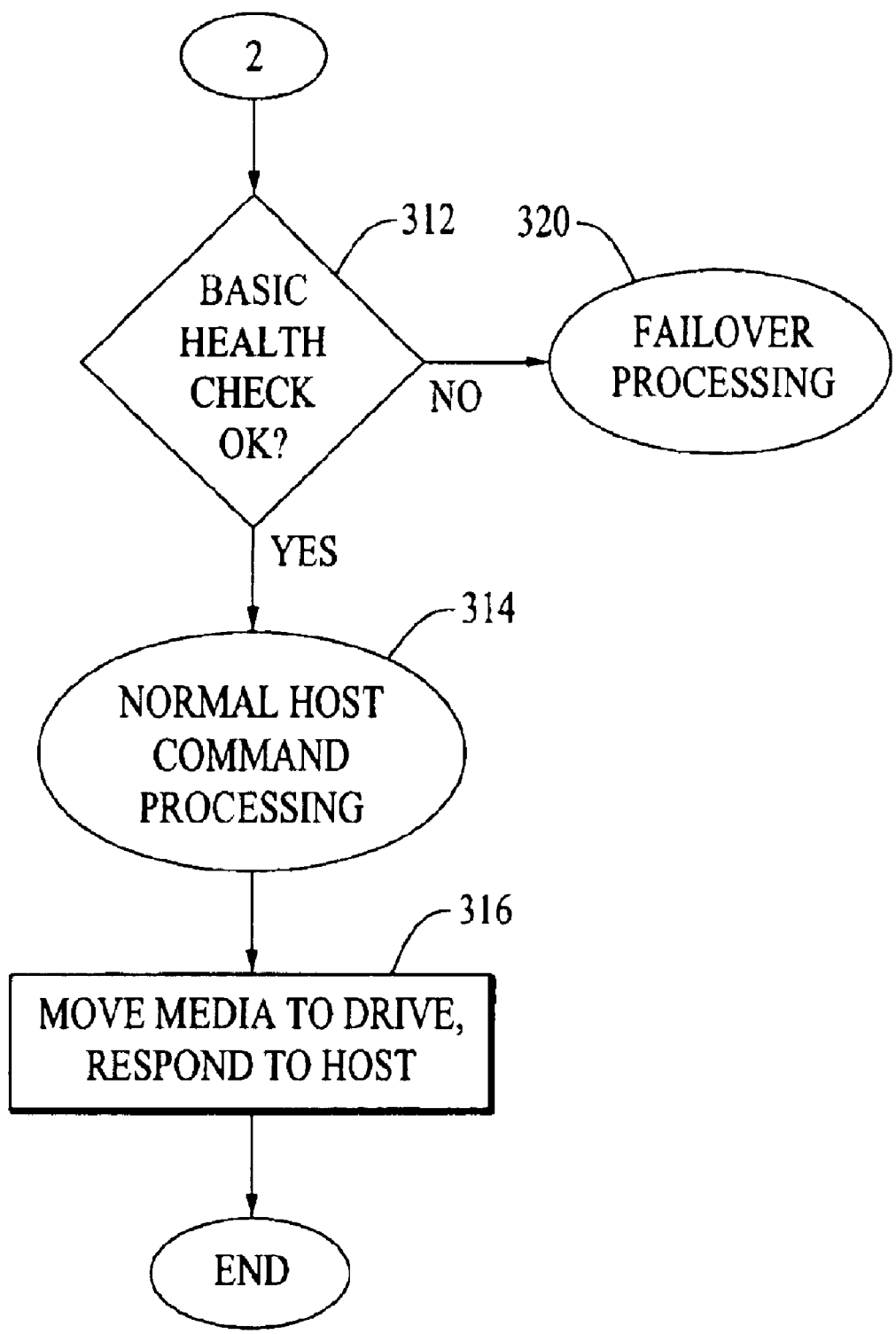

A flowchart of a control process implementing the present invention and executed e.g. by the library controller 146 within SCSI-only examples of FIGS. 2–5 is set forth in FIG. 8. A power on start step 300 is performed which initializes the library 100 into an operative state. A related initial step includes taking an inventory of cartridges against slot locations. The inventory may be by any conventional fashion, such as optically scanning a bar code affixed to each cartridge in order to ascertain and record e.g. a unique volume tag and associate the volume tag with the slot logical address. The inventory may also include an inventory of available active elements, such as the tape drives.

The library controller 146 reserves one or more of the tape drives as spare tape drives (e.g., by resetting the spare tape drive via the library port (RS422), and not configuring the SCSI ID) (step 302), and configures the library 100 as a virtual library by masking (hiding) the spare tape drives from the host system 12 as described (step 304). The library controller 146 then receives and decodes host commands (including CDB) such as a move media command including a destination address identifying a tape drive (step 306). If the command is e.g. an EXCHANGE MEDIUM command, the library controller 146 scans the identified tape drive e.g., via the loader controller 144 using the library interface port of the tape drive to determine if the identified tape drive is ready to load in order to execute the command (step 308). If the identified tape drive is ready to load (step 310), and the identified tape drive is operational (e.g., healthy) (step 312), then the library controller 146 follows normal command processing (step 314) and controls the loader controller 144 to move the requested tape cartridge into the identified tape drive, and responds to the host system 12 (step 316).

Figure 8C:
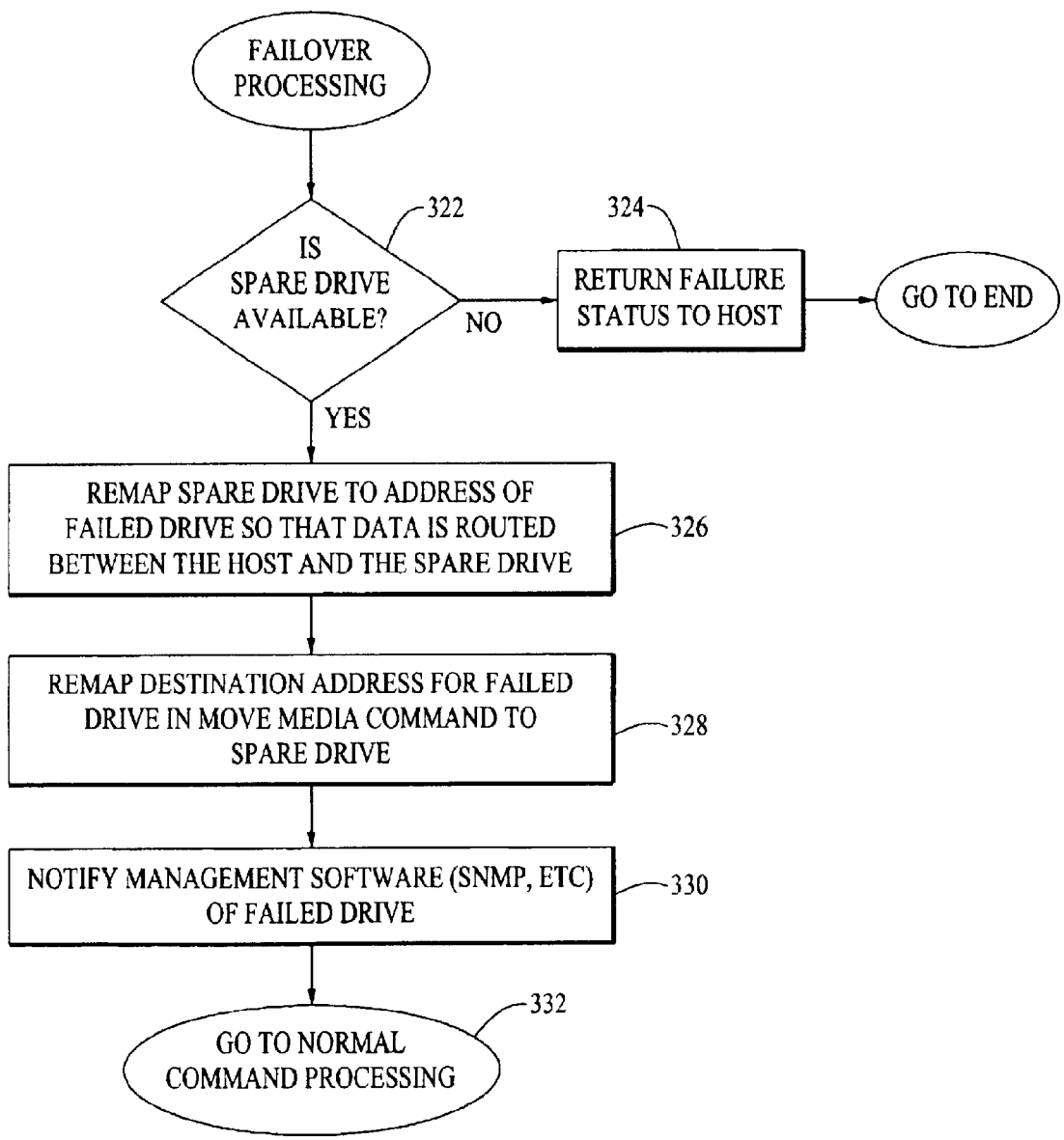

If in step 310 the identified tape drive is not ready to load, the library controller 146 begins 'failed drive processing' (step 318). Similarly, if in step 312, the identified tape drive is not operation, the library controller 146 begins 'failed drive processing' (step 320). Referring to FIG. 8C, 'failed drive processing' includes determining of a spare tape drive is available (step 322). If not, a failure status is returned to the host system (step 324). If other spare tape drives exist, the library controller 146 can check their availability, and return a failure status to the host if none of the spare tape drives are available (i.e. none of the spare tape drives are operational, free, etc.).

If a spare tape drive is available, then the library controller 146 redirects/vectors the logical address of the spare tape drive to correspond to the destination address specified by e.g. the EXCHANGE MEDIUM command (step 326). For the SCSI implementations of the present invention (e.g., FIGS. 2–5), the tape drive addresses are altered by: (1) resetting the failed tape drive via the library port and not programming the failed tape drive's SCSI ID (this logically removes the failed tape drive from the SCSI bus wherein the failed tape drive no longer responds to host commands), and (2) programming the spare tape drive to the SCSI ID:LUN of the failed tape drive, whereby instead of the failed tape drive, the spare tape drives responds to host commands. As such, the spare tape drive responds to host commands sent to failed tape drive following said EXCHANGE MEDIUM command. Further, the library controller 146 remaps destination address for the failed tape drive in the move media command to the address of the spare tape drive so that the loader controller 144 loads the requested tape into the spare tape drive (step 328). Step 328 is similar to step 228 in FIG. 7C, wherein processing by the controller 146 is performed with respect to host commands destined for the robotic controller 144, and includes the altering of the logical addresses within the library 10 for the tape drives, whereby the addressing is altered to affect which tape drive a tape is placed in or picked from. After step 328, the library controller 146 can further notify the management software (e.g., SNMP) of the identity of the failed drive for reporting and repairs (step 330). Thereafter, the library controller 146 proceeds with normal command processing (step 332).

As such, in one version, the present invention provides a reliable and fail safe architecture for a digital storage media library that overcomes significant limitations and drawbacks associated with the conventional media libraries. A failover process according to the present invention provides many advantages, including for example:

(1) Having no effect on host software applications, and requires no support from ISVs (i.e., Independent Software Vendor, an example of which would be Legato (TM or Veritas (TM))
(2) Addressing failure due to "ingested tape leaders", one of the most important failures for ATL (TM) libraries;
(3) Enabling on line health check and diagnostics of tape drives; and
(4) Allowing user of a spare tape drive instead of a tape drive specified by the host based occurrence of a condition, such as e.g. the specified tape drive is not available, requirement of wear leveling of tape drives within a library, requirement of diagnostic health checks for predictive failure analysis described above, etc.

Though in the embodiments of the present invention described herein a tape library has been described, the present invention is equally application to other media libraries such as e.g. optical disc libraries, etc. Further, though the bridge 25 is shown (e.g., FIG. 6A) as a fiber channel bridge and connected to the host system 12 via a fiber channel 15, in another embodiment, the bridge 25 can comprise an Ethernet bridge and the link 15 can comprise an Ethernet link for connecting the bridge 25 to the host 12 and in the interface 29 is for an Ethernet connection.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A method for controlling a digital data storage unit comprising a multiplicity of storage media slots for receiving media storage units, a plurality of media storage units loaded in some of the storage media slots, a plurality of data storage drives electrically connected to the digital data storage unit, each data storage drive having a unique drive address, a loader mechanism for selectively moving a media storage unit between a storage media slot and one of the plurality of data storage drives, a storage unit controller connected to at least one host computer, the method comprising the steps of:

reserving one or more of the data storage drives as spare data storage drives;

decoding a host command sent by the host computer at the storage unit controller, the host command including a source address corresponding to a storage media slot location and a destination address corresponding to a data storage drive specified by the host computer;

determining if the specified data storage drive is available;

if the specified data storage drive is not available, then using a spare data storage drive instead of the specified data storage drive by moving the media storage unit to the spare data storage drive.

2. The method of claim 1, wherein the step of determining availability of the specified data storage drive is determined on the basis of detecting occurrence of at least one predetermined condition.

3. The method of claim 1, wherein the step of determining availability of the specified data storage drive comprises the steps of determining if the specified data storage drive is operational.

4. The method of claim 1, wherein the step of determining if the specified data storage drive is available includes polling the specified data storage drive for status information.

5. The method of claim 1, wherein the step of determining availability of the specified data storage drive is determined on a basis for equalizing wear among two or more of all the date storage drives.

6. The method of claim 1, wherein the step of using a spare data storage drive in place of the specified data storage drive includes the steps of: redirecting the host command from the specified data storage drive to the spare data storage drive.

7. The method of claim 6, wherein the step of redirecting the host command from the specified data storage drive to the spare data storage drive includes the steps of changing the drive address of the spare data storage drive to correspond to the destination address of the specified data storage drive.

8. The method of claim 6, wherein the step of redirecting the host command from the specified data storage drive to the spare data storage drive includes the steps of changing the destination address specified by the host computer to correspond to the drive address of the spare data storage drive and sending the host command to the spare data storage drive.

9. The method of claim 1, wherein:
the digital data storage unit comprises a tape library,
the media storage units comprise tape cartridges, and
the data storage drives comprise tape drives.

10. The method of claim 1, wherein the step of reserving spare data storage drives further includes the steps of masking the spare data storage drives from the host computer.

11. The method of claim 10, wherein the step of masking the spare data storage drives includes the steps of masking the spare data storage drives from the host computer such the spare data storage drives are not directly accessible by the host computer.

12. The method of claim 10, wherein the step of masking the spare data storage drives includes the steps of configuring the spare data storage drives to ignore direct host commands.

13. The method of claim 1, wherein the step of using a spare data storage drive in place of the specified data storage drive includes the steps of:
redirecting data flow between the host and the specified data storage drive, to the spare data storage drive, and
moving the media storage unit at the storage media slot location to the spare data storage drive.

14. The method of claim 13, wherein:
the data storage drives are electrically connected to the host computer by a bus structure including a fiber channel, via a bridge device electrically connected between the fiber channel and the data storage drives; and
the step of redirecting data flow includes the steps of redirecting at least one data flow route within the bridge device between the host and the specified data storage drive, to the spare data storage drive.

15. The method of claim 14, wherein:
the step of reserving spare data storage drives further includes the steps of masking the spare data storage drives from the host computer via the bridge device.

16. The method of claim 14, wherein:
the bridge device is configured such that the step of redirecting data flow routes within the bridge device from a specified data storage drive to a spare data storage drive does not generate a topology change notification.

17. A digital data storage unit comprising:
a multiplicity of storage media slots for receiving storage media units,
a plurality of storage media units loaded in particular ones of the storage media slots,
a plurality of data storage drives electrically connected to the digital data storage unit, each data storage drive having a unique logical drive address, the data storage drives connected to at least a host computer via a bus structure, wherein one or more of the data storage drives are reserved as spare data storage drives,
a loader mechanism for selectively moving a storage media unit between a storage media slot and one of the plurality of data storage drives, and
a storage unit controller connected to the host computer, the storage unit controller configured for:
receiving and decoding a host command sent by the host computer at the storage unit controller, the host command including a source address corresponding to a storage media slot location, and a logical destination drive address corresponding to a data storage drive specified by the host computer, and
determining if the specified data storage drive is available, and if not, then using a spare data storage drive instead of the specified data storage drive by moving the media storage unit to the spare data storage drive.

18. The digital data storage unit of claim 17, wherein the bus structure comprises a bus in accordance with a Small Computer Systems Interface (SCSI) bus specification.

19. The digital data storage unit of claim 17, wherein the storage unit controller is further configured for using a spare data storage drive in place of the specified data storage drive by: redirecting the host command from the specified data storage drive to the spare data storage drive, and controlling the loader mechanism for moving the media storage unit at the storage media slot location to the spare data storage drive.

20. The digital data storage unit of claim 17, wherein:
the bus structure comprises at least a fiber channel electrically connecting the host computer to the data storage drives via a bridge device, such that the bridge device is electrically connected between the fiber channel and the data storage drives.

21. The digital data storage unit of claim 20, wherein:
the bridge device is connected to the storage unit controller, and
the storage unit controller is further configured for controlling the bridge device to redirect data flow between the host and the specified data storage drive to the spare data storage drive.

22. The digital data storage unit of claim 21, wherein:
the storage unit controller reserves the spare data storage drives by masking the spare data storage drives from the host computer via the bridge device.

23. The digital data storage unit of claim 17, wherein the storage unit controller comprises:
a loader controller for controlling the loader mechanism to selectively move a storage media unit between a storage media slot and one of the plurality of data storage drives;
a storage controller configured for:

receiving and decoding a host command sent by the host computer at the storage controller, the host command including a source address corresponding to a storage media slot location, and a logical destination drive address corresponding to a data storage drive specified by the host computer, and determining if the specified data storage drive is available, and if not, then using a spare data storage drive in place of the specified data storage drive, and signaling the storage controller for moving the requested media storage unit at the storage media slot location to the spare data storage drive.

24. The digital data storage unit of claim 23, wherein the storage controller comprises a microcontroller programmed to perform said storage unit controller functions including receiving and decoding said host command, and determining if the specified data storage drive is available, and if not, using a spare data storage drive in place of the specified data storage drive and generating control signals for the loader controller to move the requested media storage unit at the storage media slot location to the spare data storage drive.

25. The digital data storage unit of claim 23, wherein the storage controller is further configured for redirecting the host command from the specified data storage drive to the spare data storage drive.

26. The digital data storage unit of claim 23, wherein the storage controller is further configured for redirecting data flow between the host and the specified data storage drive to the spare data storage drive.

27. The digital data storage unit of claim 17, wherein each storage media unit comprises a tape cartridge, and wherein the data storage drives comprise tape drives for writing and reading digital data to and from tape media within one or more tape cartridges.

28. The digital data storage unit of claim 17, wherein the storage unit controller is further configured for determining availability of the specified data storage drive on the basis of detecting occurrence of at least one predetermined condition.

29. The digital data storage unit of claim 17, wherein the storage unit controller is further configured for determining availability of the specified data storage drive by determining if the specified data storage drive is operational.

30. The digital data storage unit of claim 17, wherein the storage unit controller is further configured for determining availability of the specified data storage drive on a basis for equalizing wear among two or more of all the data storage drives.

31. The digital data storage unit of claim 17, wherein the storage unit controller is further configured for reserving the spare data storage drives by masking the spare data storage drives from the host computer.

32. The digital data storage unit of claim 31, wherein the spare data storage drives are not directly accessible by the host computer.

33. The digital data storage unit of claim 31, wherein the spare data storage drives are configured to ignore direct host commands.

34. A digital data storage unit comprising:
a multiplicity of storage media slots for receiving tape cartridges, each tape cartridge including at least one spool of magnetic recording tape,
at least a plurality of tape cartridges loaded in particular ones of the storage media slots,
a plurality of tape drives electrically connected to the digital data storage unit, each tape drive having a unique logical drive address, the data storage drives electrically connected to at least a host computer via a bus structure, wherein one or more of the data storage drives are reserved as spare data storage drives,
a loader mechanism for selectively moving a tape cartridge between a storage media slot and one of the tape drives,
a storage unit controller connected to the host computer, the storage unit controller comprising:
a storage controller configured for:
masking one or more of the tape drives from the host computer as spare tape drives, whereby the spare tape drives are not directly accessible by the host computer,
receiving and decoding a slot-to-logical tape drive exchange command including a logical drive address for a specified tape drive and location of a storage media slot holding a requested tape cartridge, sent by the host computer,
determining if the specified data storage drive is available, and if not, using a spare tape drive in place of the specified destination tape drive, and
a loader controller responsive to the storage controller for operating the loader mechanism to move the requested tape cartridge from the storage media slot location to the spare tape drive and for loading the requested tape cartridge into the said spare tape drive.

35. The digital data storage unit of claim 34, wherein the bus structure comprises a bus in accordance with a Small Computer Systems Interface (SCSI) bus specification.

36. The digital data storage unit of claim 35, wherein each tape drive is connected by the bus structure to the host computer.

37. The digital data storage unit of claim 35, wherein:
the bus structure further comprises at least a fiber channel connecting the host computer to the SCSI bus via a bridge device; and
each tape drive is connected to the SCSI bus.

38. The digital data storage unit of claim 37, wherein the bridge device is configured to redirect said data flow by redirecting at least one data flow route within the bridge device between the host and the specified tape drive to the spare tape drive.

39. The digital data storage unit of claim 37, wherein the bridge device is configured for masking the spare tape drives from the host computer.

40. The digital data storage unit of claim 34, wherein the storage controller is further configured for causing a logical drive address of a spare tape drive to match the logical drive address of the specified destination tape drive in the said slot-to-logical tape drive exchange command, thereby redirecting said slot-to-logical tape drive exchange command to one of the spare tape drives.

41. The digital data storage unit of claim 34, wherein the storage controller is further configured for redirecting data flow between the host and the destination tape drive to the spare tape drive.

42. The digital data storage unit of claim 41, wherein:
the bridge device is connected to the storage controller; and
the storage controller is further configured for controlling the bridge device to redirect data flow between the host computer and the specified tape drive, to the spare tape drive via the bridge device.

43. The digital data storage unit of claim 34, wherein the storage controller is further configured for determining availability of the specified tape drive on the basis of detecting occurrence of at least one predetermined condition.

44. The digital data storage unit of claim 34, wherein the storage controller is further configured for determining availability of the specified tape drive by determining if the specified data storage drive is read to load.

45. The digital data storage unit of claim 34, wherein the storage controller is further configured for determining availability of the specified data storage drive on a basis for equalizing wear among two or more of all the data storage drives.

46. The digital data storage unit of claim 34, wherein the storage controller is further configured for reserving the spare data storage drives by masking the spare data storage drives from the host computer.

47. The digital data storage unit of claim 46, wherein the spare data storage drives are not directly accessible by the host computer.

48. The digital data storage unit of claim 46, wherein the spare data storage drives are configured to ignore direct host commands.

* * * * *